(12) United States Patent
Diner et al.

(10) Patent No.: US 7,935,767 B2
(45) Date of Patent: May 3, 2011

(54) MULTIBLOCK POLYMER DISPERSIONS OF CARBON NANOTUBES

(75) Inventors: Bruce A. Diner, Chadds Ford, PA (US); Lech Wilczek, Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 746 days.

(21) Appl. No.: 11/951,350

(22) Filed: Dec. 6, 2007

(65) Prior Publication Data

US 2010/0256307 A1    Oct. 7, 2010

Related U.S. Application Data

(60) Provisional application No. 60/871,290, filed on Dec. 21, 2006.

(51) Int. Cl.
*C08F 120/06* (2006.01)
(52) U.S. Cl. .............. 525/330.1; 977/748; 977/750; 977/847
(58) Field of Classification Search .......... 524/577; 526/317.1; 977/742, 746, 842
See application file for complete search history.

(56) References Cited

U.S. PATENT DOCUMENTS

| 4,508,880 A | 4/1985 | Webster |
| 6,783,746 B1 | 8/2004 | Zhang et al. |
| 2004/0132072 A1 | 7/2004 | Zheng et al. |

FOREIGN PATENT DOCUMENTS

| JP | 2004269799 | 9/2004 |
| WO | WO 03/050332 A1 | 6/2003 |
| WO | WO 2005073305 A1 * | 8/2005 |

OTHER PUBLICATIONS

Shvartzman-Cohen et al. "Selective Dispersion of Single-Walled Carbon Nanotubes in the Presence of Polymers: The Role of Molecular and Colloidal length Scales", Journal of the American Chemical Society, 2004, 126(45), 14850-14857.*
Shvartman-Cohen et al., Selective Dispersion of Single-Walled Carbon Nanotubes in the Presence of Polymers: The Role of Molecular and Collodial Length Scales, J. Am. Chem. Soc., 2004, vol. 126:14850-14857.
Salalha et al., Single-Walled Carbon Nanotubes Embedded in Oriented Polymeric Nanofibers by Electrospinning, Langmuir, 2004, vol. 20:9852-9855.
Kitano et al., Wrapping of Single-Walled Carbon Nanotubes With A-B-A Block Telomers, Macromolecular Chemistry and Physics, 2004, vol. 205:2064-2071.
Li et al., Carbon Nanotube/Epoxy Resin Composites Using a Block Copolymer as a Dispersing Agent, Phys. Stat. Sol., 2004, vol. 201:89-91.

* cited by examiner

*Primary Examiner* — Michael M Bernshteyn (57) ABSTRACT

Novel multiblock polymers are prepared and used to disperse carbon nanotubes in solution.

6 Claims, 1 Drawing Sheet

FIG. 1

MULTIBLOCK POLYMER DISPERSIONS OF CARBON NANOTUBES

FIELD OF THE INVENTION

This invention relates to novel multiblock polymers and to the use of multiblock polymers to disperse carbon nanotubes.

BACKGROUND OF THE INVENTION

Carbon nanotubes have been the subject of intense research since their discovery in 1991. Carbon nanotubes possess unique properties such as small size and electrical conductivity, which makes them suitable in a wide range of applications, including use as structural materials in molecular electronics, nanoelectronic components, and field emission displays. Carbon nanotubes may be multi-walled (MWNTs) or single-walled (SWNTs) and have dimensions in the nanometer range.

Depending on their atomic structure, carbon nanotubes may have metallic or semiconductor properties, and these properties, in combination with their small dimensions, make carbon nanotubes particularly attractive for use in fabrication of nano-devices. A major obstacle to such efforts has been the diversity of tube diameters, chiral angles, and aggregation states in nanotube samples obtained from the various preparation methods. Aggregation is particularly problematic because the highly polarizable, smooth-sided fullerene tubes readily form parallel bundles or ropes with a large van der Waals binding energy. This bundling perturbs the electronic structure of the tubes, and it confounds all attempts to separate the tubes by size or type or to use them as individual macromolecular species. The construction of nanotube-based electronic devices and the effort to fractionate nanotubes in order to obtain chirally pure fractions for specific electronic applications, however, requires such dispersion at the outset.

Of the methods used to disperse carbon nanotubes, sonication of carbon nanotube ropes in aqueous solutions of deoxyribonucleic acid (DNA) has been most successful (see commonly owned U.S. Ser. No. 10/716,346). While able to yield individually dispersed nanotubes that can subsequently be fractionated based on their electronic properties and diameter, the cost of doing so on a large scale is prohibitively expensive, owing primarily to the cost of the DNA. Small, inexpensive surfactants such as sodium dodecyl sulfate (SDS) have been used successfully for the dispersion but are not suitable for chromatographic fractionation based on electronic properties.

There remains a need therefore for inexpensive materials and methods for the dispersion of carbon nanotubes. Applicants have solved the stated problem by providing methods for the dispersion of carbon nanotubes using solutions of multiblock polymers.

SUMMARY OF THE INVENTION

The invention relates to the use of multiblock polymers for the dispersion of carbon nanotubes. Of particular use in the present method are polymers having the general structure:
The multiblock polymers can have the formula:

wherein $R_1$ is benzylmethacrylate;
$R_2$ is methacrylic acid or salt thereof;
x is an integer ranging from 1 to 15;
y is an integer from 1 to 25;
z is an integer ranging from 1 to 13;
a is an integer from 0 to 15; and
b is 0 or y.

Accordingly one aspect of this invention is to provide a method for dispersing a population of carbon nanotubes comprising:
(a) providing a solution of multiblock polymers;
(b) contacting a population of carbon nanotubes with an effective amount of the multiblock polymer solution of step (a) for a time sufficient to disperse the carbon nanotubes; and
(c) optionally recovering the dispersed carbon nanotubes.

In another aspect the invention provides a carbon nanotube-multiblock polymer complex comprising an unfunctionalized carbon nanotube bound to a multiblock polymer.

DETAILED DESCRIPTION OF THE INVENTION

Applicants specifically incorporate the entire content of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

The present invention relates to methods of dispersing aggregated carbon nanotubes. Carbon nanotubes are typically generated in aggregated bundles referred to as "ropes". Unless the carbon nanotube can be dispersed they can not be used as components for microdevices such as field-emission transistors, artificial actuators, molecular-filtration membranes, energy-absorbing materials, molecular transistors, and other optoelectronic devices as well as in gas storage, single-electron devices, and chemical and biological sensors. Dispersion of carbon nanotubes is an essential feature of the utility of these materials.

In the context of this disclosure, a number of terms shall be utilized.

The terms "(meth)acrylic" and "(meth)acrylate" as used herein denote "methacrylic or acrylic" and "methacrylate or acrylate" respectively.

The term "carbon nanotube" refers to a hollow article composed primarily of carbon atoms. The carbon nanotube can be doped with other elements, e.g., metals. The nanotubes typically have a narrow dimension (diameter) of about 0.5-200 nm and a long dimension (length), where the ratio of the long dimension to the narrow dimension, i.e., the aspect ratio, is at least 5. In general, the aspect ratio is between 10 and 2000. The carbon-based nanotubes of the invention can be multiwalled nanotubes (MWNTs) or single-walled nanotubes (SWNTs). A MWNT, for example, includes several concentric nanotubes each having a different diameter. Thus, the smallest diameter tube is encapsulated by another larger diameter tube, which in turn is encapsulated by another larger diameter nanotube. A SWNT, on the other hand, includes only one nanotube.

Carbon nanotubes may be produced by a variety of methods and are additionally commercially available. Methods of carbon nanotube synthesis include laser vaporization of graphite (A. Thess et al., Science 273:483-87 (1996)), arc discharge (C. Journet et al., Nature 388:756-58 (1997)), and HiPCo (high pressure carbon monoxide) process (P. Nikolaev et al., Chem. Phys. Lett. 313:91-97 (1999)). Chemical vapor deposition (CVD) can also be used in producing carbon nanotubes (J. Kong et al., Chem. Phys. Lett. 292:567-74 (1998); J. Kong et al., Nature 395:878-79 (1998); A. Cassell et al., J. Phys. Chem. 103:6484-92 (1999); H. Dai et al., J. Phys. Chem. 103:11246-55 (1999)).

Additionally, carbon nanotubes may be grown via catalytic processes both in solution and on solid substrates (Y. Li et al., Chem. Mater. 13(3):1008-14 (2001)); (N. Franklin and H. Dai, Adv. Mater. 12:890-94 (2000); A. Cassell et al., J. Am. Chem. Soc. 121:7975-76 (1999)).

The term "unfunctionalized" as used herein and in reference to carbon nanotubes refers to the lack of reactive chemical or "functional groups on the surface of the carbon nanotube. Typical functional groups would include, but not be limited to amine groups, carboxyl or hydroxyl groups. Such group provide points of reactivity on the surface of the carbon nanotube. The multiblock polymers of the invention are capable of dispersing carbon nanotubes lacking any such groups.

A carbon nanotube may be referred to as have "semiconductor" properties. By semiconductor it is meant that the carbon nanotube has intermediate conductivity between insulators and conductors with respect to the movement of electrons. A carbon nanotube will be considered to have metallic properties if it behaves like a conductor with respect to the movement of electrons.

The term "multiblock polymers" refers to block copolymers composed of more than three blocks in contrast to typically used di- and tri-blocks containing at least two different hydrophobic and hydrophilic comonomers.

The term "hydrophobic monomer" refers to monomers that have solubility in water of less than 5 g in 100 cm$^3$ of deionised water at 25° C., or, when polymerized, form homopolymers that have a solubility in water of less than 5 g in 100 cm$^3$ of deionised water at 25° C.

The term "hydrophilic monomer" refers to monomers that have a solubility in water of at least 5 g in 100 cm$^3$ of deionized water at 25° C., or, when polymerized, form homopolymers that have a solubility in water of at least 5 g in 100 cm$^3$ of deionized water at 25° C.

The terms "hydrophilic block" and "hydrophobic block" refers to blocks of polymerized monomers in a multiblock polymer that are formed from hydrophilic or hydrophobic monomers, respectively.

The term "carbon nanotube-multiblock polymer complex" means a composition comprising a carbon nanotube loosely associated with at least one multiblock polymer. Typically the association between the multiblock polymer and the nanotube is by van der Waals bonds or some other non-covalent means.

The term "agitation" refers to the facilitation of dispersion of nanotubes and multiblock polymers. A typical agitation disperses the nanotubes and multiblock polymers through sonication.

Multiblock polymers have been specifically designed, synthesized using group transfer polymerization methods, and screened for carbon nanotube dispersion. General description of group transfer polymerization techniques, including solvents, catalysts, and reaction conditions, can be found in Webster, O. W., Advances in Polymer Science (2004), 167 (New Synthetic Methods), 1-34 and Heftier, W., Plastics Engineering (New York) (1997), 40(Macromolecular Design of Polymeric Materials), 109-122.

The polymers are amphiphilic, containing hydrophobic and hydrophilic charged blocks. The polymers are optimized for dispersion through a succession of syntheses in which the hydrophobic/hydrophilic comonomer ratio, the size of the blocks, and the length of the polymer were varied. The efficacy of dispersion is evaluated by UV/Vis optical spectroscopy in which the optical density and the narrowness of the absorbance bands of the dispersed nanotube solutions were compared for each polymer. Preferred multiblock polymers are those having elevated optical densities and sharp absorbance bands similar to those obtained with DNA.

Suitable hydrophilic monomers include, but are not limited to, methacrylic acid, acrylic acid, dimethylaminoethyl methacrylate, diethylaminoethyl methacrylate, t-butylaminoethyl methacrylate, dimethylaminoethyl acrylate, diethylaminoethyl acrylate, dimethylaminopropyl methacrylamide, methacrylamide, acrylamide, and dimethylacrylamide. Suitable hydrophobic monomers include, but are not limited to, methyl methacrylate, ethyl methacrylate, propyl methacrylate, butyl methacrylate, hexyl methacrylate, 2-ethylhexyl methacrylate, octyl methacrylate, benzyl methacrylate, lauryl methacrylate, stearyl methacrylate, phenyl methacrylate, hydroxyethyl methacrylate, hydroxypropyl methacrylate, 2-ethoxyethyl methacrylate, methacrylonitrile, 2-trimethylsiloxyethyl methacrylate, glycidyl methacrylate, p-tolyl methacrylate, sorbyl methacrylate, methyl acrylate, ethyl acrylate, propyl acrylate, butyl acrylate, hexyl acrylate, 2-ethylhexyl acrylate, octyl acrylate, lauryl acrylate, stearyl acrylate, phenyl acrylate, hydroxyethyl acrylate, hydroxypropyl acrylate acrylonitrile, 2-trimethyl-siloxyethyl acrylate, glycidyl acrylate, p-tolyl acrylate, benzyl acrylate, and sorbyl acrylate.

Blocked precursors to any of monomers can also be used.

In one aspect, the multiblock polymers have the formula:

wherein $R_1$ is benzylmethacrylate; $R_2$ is methacrylic acid or it's salt; x is an integer ranging from 1 to 15; y is an integer from 1 to 25; z is an integer ranging from 1 to 13; a is an integer ranging from 0 to 15; and b is 0 or y. The multiblock copolymers can contain more than two different hydrophobic and hydrophilic comonomers.

In a preferred embodiment, the multiblock polymers have the formula:

wherein x is an integer ranging from 1 to 15; y is an integer from 1 to 25; z is an integer ranging from 1 to 13; a is an integer ranging from 0 to 15; and b is 0 or y.

These multiblock polymers can be synthesized in large batches at a tiny fraction of the cost associated with DNA synthesis. In addition, the degrees of freedom of the polymer libraries with regard to the nature of the hydrophobic and hydrophilic groups, the sign and density of the charges, and the flexibility of the polymer backbone all exceed that of DNA. Additionally, polymer dispersions of nanotubes can be fractionated by ion exchange chromatography with a dependence of diameter on ionic strength different from that observed with DNA.

To synthesize a multiblock polymer for use in dispersing carbon nanotubes, blocks of hydrophobic monomers such as, for example, benzylmethacrylate (BzMA) and hydrophilic monomers such as, for example, trimethylsilylmethacrylate (TMSMA, is a blocked precursor to methacrylic acid) are polymerized.

(a) providing a reaction mixture comprising a hydrophobic monomer, an initiator and a catalyst
(b) adding a hydrophilic monomer and, optionally, a catalyst to the reaction mixture;
(c) reacting the hydrophilic monomer with the hydrophobic or hydrophilic monomer; whereby a polymerized hydrophobic-hydrophilic or hydrophobic-hydrophobic block polymer is produced;
(d) adding additional hydrophobic monomer to the reaction mixture;
(e) reacting the additional hydrophobic monomer with the polymerized hydrophobic-hydrophilic or hydrophobic-hydrophobic block polymer, whereby a hydrophobic element is polymerized to the block polymer;
(f) adding additional hydrophilic monomer and, optionally, additional catalyst to the reaction mixture;
(g) reacting the additional hydrophilic monomer with the hydrophobic element, whereby a multiblock polymer is produced;
(h) adding additional hydrophobic monomer to the reaction mixture;
(i) reacting the additional hydrophobic monomer with the multiblock polymer, whereby a hydrophobic element is polymerized to the multiblock polymer;
(j) optionally, repeating steps (f)-(i) at least once
(k) optionally, recovering the multiblock polymer; and
(l) deactivating catalyst, removing trimethylsilyl groups blocking carboxylic groups.

Multiblock polymers can also be synthesized using a similar method as the above method with the proper initiators that reverses the role of the hydrophobic and hydrophilic monomers, that is a hydrophilic monomer in step a is used instead of a hydrophobic monomer, etc.

The catalyst used in each separate step can be the same or different than that used in a different step, and can also be a mixture of catalysts. Suitable catalysts are those generally used in group-transfer polymerizations The final product is controlled by time from 15 min. to 24 hours, temperature from 20 to 70° C., concentrations of comonomers from 5 to 80 wt %, initiator and catalyst. Preferred multiblock copolymer acid values are in the range from 50 to 250, Mn in the range from 1,000 to 30,000 and Mw/Mn<2.

The multiblock polymers are dispersible in aqueous solutions. Preferably, multiblock polymers are dispersed in an aqueous solution. To solubilize the hydrophilic block into the aqueous medium, it may be necessary to make salts of either the acid or amino groups contained in the hydrophilic block. Salts of the acid monomers can be made with the counter component being selected from organic bases such as mono-, di, tri-methylamine, morpholine, n-methyl morpholine; alcohol amines such as dimethylethanolamine (DMEA), methyldiethanolamine, mono-, di, and tri-ethanolamine; pyridine; ammonium hydroxide; tetra-alkylammonium salts such as tetramethylammonium hydroxide, tetraethyl-ammonium hydroxide; alkali metals such as lithium, sodium and potassium, and the like. Preferred neutralizing agents include dimethylethanolamine and sodium and potassium hydroxides, with potassium hydroxide being particularly preferred for inks to be used in thermal ink jet printers. Salts of the amino monomers can be made with the counter component being selected from organic acids such as acetic acid, formic acid, oxalic acid, dimethylol propionic acid, halogens such as chloride, fluoride, and bromide, and inorganic acids, such as sulfuric acid, and nitric acid, and the like. It is also possible to convert the amino group into a tetra-alkyl ammonium salt. Acetic and formic acid are preferred neutralizing agents. Amphoteric polymers, that is polymer that contains both an acid group and an amino group, may be used as is or can be neutralized with either addition of acid or base.

Once the multiblock polymers are in a suitable solution, they may be contacted with a population of bundled carbon nanotubes. It is preferred, although not necessary, that the contacting is done in the presence of agitation. Typically, agitation employs sonication, for example; however, agitation may be performed by devices that produce high shear mixing of the multiblock polymers and carbon nanotubes (i.e., homogenization). Combinations of sonication and high shear mixing are also possible. Upon agitation, the carbon nanotubes will become dispersed and will form carbon nanotube-multiblock polymer complexes comprising at least one multiblock polymer loosely associated with the carbon nanotube by hydrogen bonding or some non-covalent means.

The amount of multiblock polymer for the effective dispersion of carbon nanotubes is referred to herein as an "effective amount" and can readily be determined by the skilled person using methods well known in the art. The precise amount of multiblock polymer to be added to carbon nanotubes is not critical as long as it is sufficient to effect dispersion.

Additionally, temperature during the contacting process will have an effect on the efficacy of the dispersion.

The dispersed nanotubes can be utilized for many applications as is, or may be further processed or modified before use. Isolation or separation of the dispersed nanotubes can be performed by any means known in the art, such as gel permeation chromatography. The dispersed nanotubes may also be further functionalized either via the multiblock polymer or the surface of the nanotube itself, leading to different end uses and further processing, such as immobilization of the nanotube on a solid support.

Multiblock dispersed carbon nanotubes can be used in any application where low cost and individual nanotube dispersions are critical. Such applications include, but are not limited to, electrical connectors in microdevices (e.g., integrated circuits or semiconductor chips), antennas, optical antennas, probes for scanning tunneling microscopy (STM) or atomic force microscopy (AFM), additive to or substitute for carbon black (in, e.g., motor vehicle tires), catalysts in industrial and chemical processes, power transmission cables, solar cells, batteries, molecular electronics, probes, manipulators, and composites, among others.

EXAMPLES

The present invention is further defined in the following Examples. It should be understood that these Examples, while indicating preferred embodiments of the invention, are given by way of illustration only. From the above discussion and these Examples, one skilled in the art can ascertain the essential characteristics of this invention, and without departing from the spirit and scope thereof, can make various changes and modifications of the invention to adapt it to various usages and conditions.

General Methods

The meaning of abbreviations is as follows: "sec" means second(s), "min" means minute(s), "h" means hour(s), "d" means day(s), "μL" means microliter(s), "mL" means milliliter(s), "L" means liter(s), "μM" means micromolar, "mM" means millimolar, "M" means molar, "mmol" means millimole(s), "μmole" mean micromole(s), "g" means gram(s), "μg" means microgram(s), "ng" means nanogram(s), "U" means unit(s), "bp" means base pair(s) and "kB" means kilobase(s).

Example 1

Polymer and Polymer Dispersion/Solution Preparation 1 [Nona-Block MAA-(BzMA5-MAA3)4-BzMA5

Tetrahydrofuran (THF; stored over 3 A sieves), 80 g; 1,1-bis(trimethylsiloxy)-2-methyl-1-propene, 4.02 g (17.3 mmole); and mesitylene, 0.2 g, were charged into a dry glass reactor in a dry-box. The catalyst tetrabutyl ammonium m-chlorobenzoate, 0.1 g of a 1.0 M solution in acetonitrile, was then added. Benzylmethacrylate (BzMA; purified by passing over a column of basic alumina and stored over 3 A sieves), 15.35 g (87.1 mmole), was then added at room temperature. After 46 minutes, 0.55 g sample was withdrawn, quenched with 0.1 g methanol, and 0.025 g decane was added followed by GC (gas chromatography) determination of BzMA concentration. The GC showed over 95% BzMA conversion.

The catalyst tetrabutyl ammonium m-chlorobenzoate, 0.1 g of a 1.0 M solution in acetonitrile, was then added. Trimethylsilyl methacrylate (TMS-MAA, a blocked precursor to methacrylic acid), 8.24 g (52.2 mmole), was then added. After 63 minutes, BzMA (purified by passing over a column of basic alumina and stored over 3 A sieves), 15.29 g (86.8 mmole), was then added. After 60 minutes, 0.54 g sample was withdrawn, quenched with 0.1 g methanol, and 0.025 g decane was added followed by GC determination of BzMA concentration. The GC showed over 95% BzMA conversion.

The catalyst tetrabutyl ammonium m-chlorobenzoate, 0.1 g of a 1.0 M solution in acetonitrile, was then added. TMS-MAA, 8.29 g (52.5 mmole), was then added. After 49 minutes, BzMA (purified by passing over a column of basic alumina and stored over 3 A sieves), 15.26 g (86.6 mmole), was then added. After 50 minutes, 0.52 g sample was withdrawn, quenched with 0.1 g methanol, and 0.025 g decane was added followed by GC determination of BzMA concentration. The GC showed over 95% BzMA conversion.

The catalyst tetrabutyl ammonium m-chlorobenzoate, 0.1 g of a 1.0 M solution in acetonitrile, was then added. TMS-MAA, 8.24 g (52.2 mmole), was then added. After 51 minutes, BzMA (purified by passing over a column of basic alumina and stored over 3 A sieves), 15.25 g (86.5 mmole), was then added. After 46 minutes, 0.53 g sample was withdrawn, quenched with 0.1 g methanol, and 0.025 g decane was added followed by GC determination of BzMA concentration. The GC showed over 95% BzMA conversion.

The catalyst tetrabutyl ammonium m-chlorobenzoate, 0.1 g of a 1.0 M solution in acetonitrile was then added. TMS-MAA, 8.25 g (52.2 mmole), was then added. After 63 minutes, BzMA (purified by passing over a column of basic alumina and stored over 3 A sieves), 15.41 g (87.5 mmole), was then added. After stirring for additional 16 hours, 33 g methanol was added to the reaction mixture to quench the polymer and to convert trimethylsilylcarboxyl groups into carboxylic groups. The polymer was isolated by removing volatiles from 0.64 g sample in a vacuum oven at 100° C. for 70 hours. 0.35 g sample of 50 wt % polymer solution in 2-pyrrolidinone was dissolved in 10 ml DMSO (dimethyl sulfoxide), and the acid number (115.5; acid value (AV)= 2.06) was determined by titration with 0.1 N KOH in methanol. The polymer had an Mn=5,600, Mw/Mn=1.32 as determined by GPC (SEC) (Gel Permeation Chromatography (Size Exclusion Chromatography)) vs. universal calibration in THF at room temperature.

The polymer dispersion/solution was prepared by charging 0.10 g polymer sample; deionized water, 4.86 g; and 5 wt % sodium hydroxide solution, 0.09 g, into a 20 ml glass vial, capped and homogenized by placing into an oven at 90° C. for 7 hours, while occasionally taking the vial out and shaking.

Example 2

Polymer and Polymer Dispersion/Solution Preparation 2 [Nona-Block MAA-(BzMA10-MAA6)4-BzMA10

Tetrahydrofuran (THF; stored over 3 A sieves), 40 g; 1,1-bis(trimethylsiloxy)-2-methyl-1-propene, 2.04 g (8.79 mmole); and mesitylene, 0.1 g, were charged into a dry glass reactor in a dry-box. Benzylmethacrylate (BzMA; purified by passing over a column of basic alumina and stored over 3 A sieves), 15.29 g (86.8 mmole), was then added at room temperature. The catalyst tetrabutyl ammonium m-chlorobenzoate, 0.05 g of a 1.0 M solution in acetonitrile, was then added. After 50 minutes, 0.54 g sample was withdrawn, quenched with 0.1 g methanol and 0.025 g decane, was added followed by GC (gas chromatography) determination of BzMA concentration. The GC showed over 95% BzMA conversion.

The catalyst tetrabutyl ammonium m-chlorobenzoate, 0.05 g of a 1.0 M solution in acetonitrile, was then added. Trimethylsilyl methacrylate (TMS-MAA), 8.33 g (52.7 mmole), was then added. After 50 minutes, BzMA (purified by passing over a column of basic alumina and stored over 3 A sieves), 15.20 g (86.3 mmole), was then added. After 47 minutes, 0.56 g sample was withdrawn, quenched with 0.1 g methanol, and 0.025 g decane, was added followed by GC determination of BzMA concentration. The GC showed over 95% BzMA conversion.

The catalyst tetrabutyl ammonium m-chlorobenzoate, 0.05 g of a 1.0 M solution in acetonitrile, was then added. TMS-MAA, 8.25 g (52.5 mmole), was then added. After 52 minutes, benzylmethacrylate BzMA (purified by passing over a column of basic alumina and stored over 3 A sieves), 15.24 g (86.5 mmole), was then added. After 55 minutes, 0.61 g sample was withdrawn, quenched with 0.1 g methanol, and 0.025 g decane was added followed by GC determination of BzMA concentration. The GC showed over 95% BzMA conversion.

The catalyst tetrabutyl ammonium m-chlorobenzoate, 0.05 g of a 1.0 M solution in acetonitrile, was then added. TMS-MAA, 8.29 g (52.5 mmole), was then added. After 52 minutes, BzMA (purified by passing over a column of basic alumina and stored over 3 A sieves), 15.28 g (86.7 mmole), was then added. After 51 minutes, 0.64 g sample was withdrawn, quenched with 0.1 g methanol, and 0.025 g decane was added followed by GC determination of BzMA concentration. The GC showed over 95% BzMA conversion.

The catalyst tetrabutyl ammonium m-chlorobenzoate, 0.05 g of a 1.0 M solution in acetonitrile, was then added. TMS-MAA, 8.24 g (52.2 mmole), was then added. After 61 minutes, BzMA (purified by passing over a column of basic alumina and stored over 3 A sieves), 15.23 g (86.4 mmole), was then added. After stirring for additional 15 hours, 33 g methanol was added to the reaction mixture to quench the polymer, and to convert trimethylsilylcarboxyl groups into carboxylic groups. The polymer was isolated by removing volatiles from 0.98 g sample in a vacuum oven at 100° C. for 70 hours. 0.54 g sample of 50 wt % polymer solution in 2-pyrrolidinone was dissolved in 10 ml DMSO (dimethyl sulfoxide), and the acid number (115.9; acid value (AV)= 2.07) was determined by titration with 0.1 N KOH in methanol. The polymer had a Mn=10,300, Mw/Mn=1.77 as determined by GPC (SEC) vs. universal calibration in THF at room temperature.

The polymer dispersion/solution was prepared by charging 0.10 g polymer sample; deionized water, 4.85 g; and 5 wt % sodium hydroxide solution, 0.08 g, into a 20 ml glass vial, capped and homogenized by placing into an oven at 90° C. for 7 hours, while occasionally taking the vial out and shaking.

Example 3

Polymer and Polymer Dispersion/Solution Preparation 3 [Nona-Block MAA-(BzMA15-MAA9)4-BzMA15)

Tetrahydrofuran (THF; stored over 3 A sieves), 80 g; 1,1-bis(trimethylsiloxy)-2-methyl-1-propene, 2.05 g (8.84 mmole); and mesitylene, 0.1 g, were charged into a dry glass reactor in a dry-box. Benzylmethacrylate (BzMA; purified by passing over a column of basic alumina and stored over 3 A sieves), 22.91 g (130.0 mmole), was then added at room temperature. The catalyst tetrabutyl ammonium m-chlorobenzoate, 0.05 g of a 1.0 M solution in acetonitrile, was then added. After 50 minutes, 0.56 g sample was withdrawn, quenched with 0.1 g methanol, and 0.025 g decane was added followed by GC determination of BzMA concentration. The GC showed over 95% BzMA conversion.

Trimethylsilyl methacrylate (TMS-MAA), 12.31 g (77.9 mmole), was then added. The catalyst tetrabutyl ammonium m-chlorobenzoate, 0.05 g of a 1.0 M solution in acetonitrile, was then added. After 50 minutes, BzMA (purified by passing over a column of basic alumina and stored over 3 A sieves), 22.84 g (129.6 mmole), was then added. After 49 minutes, 0.63 g sample was withdrawn, quenched with 0.1 g methanol, and 0.025 g decane was added followed by GC determination of BzMA concentration. The GC showed over 95% BzMA conversion.

TMS-MAA, 12.30 g (77.8 mmole), was then added. The catalyst tetrabutyl ammonium m-chlorobenzoate, 0.05 g of a 1.0 M solution in acetonitrile, was then added. After 50 minutes, BzMA (purified by passing over a column of basic alumina and stored over 3 A sieves), 23.00 g (130.5 mmole), was then added. After 48 minutes, 0.59 g sample was withdrawn, quenched with 0.1 g methanol, and 0.025 g decane was added followed by GC determination of BzMA concentration. The GC showed over 95% BzMA conversion.

TMS-MAA, 12.26 g (77.6 mmole), was then added. The catalyst tetrabutyl ammonium m-chlorobenzoate, 0.05 g of a 1.0 M solution in acetonitrile, was then added. After 56 minutes, BzMA (purified by passing over a column of basic alumina and stored over 3 A sieves), 22.83 g (129.6 mmole), was then added. After 52 minutes, 0.65 g sample was withdrawn, quenched with 0.1 g methanol, and 0.025 g decane was added followed by GC determination of BzMA concentration. The GC showed over 95% BzMA conversion.

TMS-MAA, 12.27 g (77.7 mmole), was then added. The catalyst tetrabutyl ammonium m-chlorobenzoate, 0.05 g of a 1.0 M solution in acetonitrile, was then added. After 52 minutes, BzMA (purified by passing over a column of basic alumina and stored over 3 A sieves), 22.86 g (129.7 mmole), was then added. After stirring for additional 16 hours, 49 g methanol was added to the reaction mixture to quench the polymer and to convert trimethylsilylcarboxyl groups into carboxylic groups. The polymer was isolated by removing volatiles from 0.94 g sample in a vacuum oven at 100° C. for 140 hours. 0.37 g sample of 50 wt % polymer solution in 2-pyrrolidinone was dissolved in 10 ml DMSO (dimethyl sulfoxide), and the acid number (110.8; acid value (AV)= 1.98) was determined by titration with 0.1 N KOH in methanol. The polymer had an Mn=13,700, Mw/Mn=2.05 as determined by GPC (SEC) vs. universal calibration in THF at room temperature.

The polymer dispersion/solution was prepared by charging 0.10 g polymer sample; deionized water, 4.88 g; and 5 wt % sodium hydroxide solution, 0.09 g, into a 20 ml glass vial, capped and homogenized by placing into an oven at 90° C. for 7 hours, while occasionally taking the vial out and shaking.

Example 4

Polymer and Polymer Dispersion/Solution Preparation 4 [Nona-Block MAA-(BzMA25-MAA15)4-BzMA25]

Tetrahydrofuran (THF; stored over 3 A sieves), 40 g; 1,1-bis(trimethylsiloxy)-2-methyl-1-propene, 1.03 g (4.44 mmole); and mesitylene, 0.05 g, were charged into a dry glass reactor in a dry-box. Benzylmethacrylate (BzMA; purified by passing over a column of basic alumina and stored over 3 A sieves), 19.17 g (108.8 mmole), was then added at room temperature. The catalyst tetrabutyl ammonium m-chlorobenzoate, 0.025 g of a 1.0 M solution in acetonitrile, was then added. After 54 minutes, 0.53 g sample was withdrawn, quenched with 0.1 g methanol, and 0.025 g decane was added followed by GC determination of BzMA concentration. The GC showed over 95% BzMA conversion.

Trimethylsilyl methacrylate (TMS-MAA), 10.29 g (65.1 mmole), was then added. The catalyst tetrabutyl ammonium m-chlorobenzoate, 0.05 g of a 1.0 M solution in acetonitrile, was then added. After 49 minutes, BzMA (purified by passing over a column of basic alumina and stored over 3 A sieves), 19.14 g (108.6 mmole), was then added. After 47 minutes, 0.54 g sample was withdrawn, quenched with 0.1 g methanol, and 0.025 g decane was added followed by GC determination of BzMA concentration. The GC showed over 95% BzMA conversion.

TMS-MAA, 10.18 g (63.4 mmole), was then added. The catalyst tetrabutyl ammonium m-chlorobenzoate, 0.025 g of a 1.0 M solution in acetonitrile, was then added. After 61 minutes, benzylmethacrylate BzMA (purified by passing over a column of basic alumina and stored over 3 A sieves), 19.11 g (108.5 mmole), was then added. After 56 minutes, 0.55 g sample was withdrawn, quenched with 0.1 g methanol, and 0.025 g decane was added followed by GC determination of BzMA concentration. The GC showed over 95% BzMA conversion.

TMS-MAA, 10.23 g (64.7 mmole), was then added. The catalyst tetrabutyl ammonium m-chlorobenzoate, 0.025 g of a 1.0 M solution in acetonitrile, was then added. After 55 minutes, BzMA (purified by passing over a column of basic alumina and stored over 3 A sieves), 19.09 g (108.3 mmole), was then added. After 52 minutes, 0.64 g sample was withdrawn, quenched with 0.1 g methanol, and 0.025 g decane was added followed by GC determination of BzMA concentration. The GC showed over 95% BzMA conversion.

THF (stored over 3 A sieves), 10.56 g, was then added to lower reaction mixture viscosity, which was very high at this moment. TMS-MAA, 10.22 g (64.7 mmole), was then added. The catalyst tetrabutyl ammonium m-chlorobenzoate, 0.025 g of a 1.0 M solution in acetonitrile, was then added. After 51 minutes, BzMA (purified by passing over a column of basic alumina and stored over 3 A sieves), 19.08 g (108.3 mmole), was then added. After stirring for additional 16 hours, 45 g methanol was added to the reaction mixture to quench the polymer and to convert trimethylsilylcarboxyl groups into carboxylic groups. The polymer was isolated by removing volatiles from 1.11 g sample in a vacuum oven at 100° C. for 24 hours. 0.54 g sample of 50 wt % polymer solution in 2-pyrrolidinone was dissolved in 10 ml DMSO (dimethyl sulfoxide), and the acid number (111.6; acid value (AV)= 1.99) was determined by titration with 0.1 N KOH in methanol. The polymer had a Mn=34,100, Mw/Mn=1.28 as determined by GPC (SEC) vs. universal calibration in THF at room temperature.

The polymer dispersion/solution was prepared by charging 0.10 g polymer sample; deionized water, 4.86 g; and 5 wt % sodium hydroxide solution, 0.09 g, into a 20 ml glass vial, capped and homogenized by placing into an oven at 90° C. for 7 hours, while occasionally taking the vial out and shaking.

Comparative Example 5

Polymer and Polymer Dispersion/Solution Preparation 5 [Random Copolymer MAA-BzMA40/MAA25]

Tetrahydrofuran (THF; stored over 3 A sieves), 30 g; 1,1-bis(trimethylsiloxy)-2-methyl-1-propene, 0.59 g (2.54 mmole); and mesitylene, 0.025 g, were charged into a dry glass reactor in a dry-box. The catalyst tetrabutyl ammonium m-chlorobenzoate, 0.025 g of a 1.0 M solution in acetonitrile, was then added. Benzylmethacrylate (BzMA; purified by passing over a column of basic alumina and stored over 3 A sieves), 15.27 g (86.7 mmole), and methacrylate (TMS-MAA), 8.47 g (53.6 mmole), were pre-mixed. A 9.76 g portion of the pre-mixed comonomer mixture was then added at room temperature. After 17 minutes, another 7.52 g of the pre-mixed comonomer mixture was added. After 16 minutes, the remaining 6.41 g of the pre-mixed comonomer mixture was added. After 61 minutes, 0.55 g sample was withdrawn, quenched with 0.1 g methanol, and 0.025 g decane was added followed by GC determination of BzMA concentration. The GC showed less than 90% BzMA conversion.

After 141 minutes, the catalyst tetrabutyl ammonium m-chlorobenzoate, 0.025 g of a 1.0 M solution in acetonitrile, was then added. After 102 minutes, 0.51 g sample was withdrawn, quenched with 0.1 g methanol, and 0.025 g decane was added followed by GC determination of BzMA concentration. The GC showed over 95% BzMA conversion.

After stirring for additional 19 hours, 9.5 g methanol was added to the reaction mixture to quench the polymer and to convert trimethylsilylcarboxyl groups into carboxylic groups. The polymer was isolated by removing volatiles from 1.04 g sample in a vacuum oven at 100° C. for 24 hours. 0.39 g sample of 50 wt % polymer solution in 2-pyrrolidinone was dissolved in 10 ml DMSO (dimethyl sulfoxide), and the acid number (147.3; acid value (AV)=2.63) was determined by titration with 0.1 N KOH in methanol. The polymer had an Mn=9,760, Mw/Mn=1.18 as determined by GPC (SEC) vs. universal calibration in THF at room temperature.

The polymer dispersion/solution was prepared by charging 0.05 g polymer sample; deionized water, 4.90 g; and 5 wt % sodium hydroxide solution, 0.13 g, into a 20 ml glass vial, capped and homogenized by placing into an oven at 90° C. for 26 hours, while occasionally taking the vial out and shaking.

Comparative Example 6

Polymer and Polymer Dispersion/Solution Preparation 6 [Random Copolymer MAA-BzMA20/MAA13]

Tetrahydrofuran (THF; stored over 3 A sieves), 30 g; 1,1-bis(trimethylsiloxy)-2-methyl-1-propene, 1.06 g (4.57 mmole); and mesitylene, 0.025 g, were charged into a dry glass reactor in a dry-box. The catalyst tetrabutyl ammonium m-chlorobenzoate, 0.025 g of a 1.0 M solution in acetonitrile, was then added. Benzylmethacrylate (BzMA; purified by passing over a column of basic alumina and stored over 3 A sieves), 15.26 g (86.6 mmole) and trimethylsilyl methacrylate (TMS-MAA), 8.46 g (53.5 mmole), were pre-mixed. A 9.75 g portion of the pre-mixed comonomer mixture was then added at room temperature. After 18 minutes, another 6.62 g of the pre-mixed comonomer mixture was added. After 19 minutes, the remaining 7.28 g of the pre-mixed comonomer mixture was added. After 160 minutes, 0.52 g sample was withdrawn, quenched with 0.1 g methanol, and 0.025 g decane was added followed by GC determination of BzMA concentration. The GC showed over 95% BzMA conversion.

After stirring for additional 22 hours, 9.5 g methanol was added to the reaction mixture to quench the polymer and to convert trimethylsilylcarboxyl groups into carboxylic groups. The polymer was isolated by removing volatiles from 0.48 g sample in a vacuum oven at 100° C. for 19 hours. 0.35 g sample of 50 wt % polymer solution in 2-pyrrolidinone was dissolved in 10 ml DMSO (dimethyl sulfoxide), and the acid number (153.6; acid value (AV)=2.74) was determined by titration with 0.1 N KOH in methanol. The polymer had an Mn=4,850, Mw/Mn=1.18 as determined by GPC (SEC) vs. universal calibration in THF at room temperature.

The polymer dispersion/solution was prepared by charging 0.09 g polymer sample; deionized water, 9.0 g; and 5 wt % sodium hydroxide solution, 0.18 g, into a 20 ml glass vial, capped and homogenized by placing into an oven at 90° C. for 120 hours, while occasionally taking the vial out and shaking.

Example 7

Polymer and Polymer Dispersion/Solution Preparation 7 [Undeca-Block MAA-(BzMA-MAA)5-BzMA Tetrahydrofuran (THF; stored over 3 A sieves), 100 g; 1,1-bis(trimethylsiloxy)-2-methyl-1-propene, 5.03 g (21.7 mmole); and mesitylene, 0.25 g, were charged into a dry glass reactor in a dry-box. The catalyst tetrabutyl ammonium m-chlorobenzoate, 0.13 g of a 1.0 M solution in acetonitrile, was then added. Benzylmethacrylate (BzMA; purified by passing over a column of basic alumina and stored over 3 A sieves), 5.10 g (28.9 mmole), was then added at room temperature. After 47 minutes, 0.54 g sample was withdrawn, quenched with 0.1 g methanol, and 0.025 g decane was added followed by GC determination of BzMA concentration. The GC showed over 95% BzMA conversion.

The catalyst tetrabutyl ammonium m-chlorobenzoate, 0.13 g of a 1.0 M solution in acetonitrile, was then added. Trimethylsilyl-methacrylate (TMS-MAA), 3.54 g (22.4 mmole), was then added. After 46 minutes, BzMA (purified by passing over a column of basic alumina and stored over 3 A sieves), 4.08 g (23.2 mmole), was then added. After 47 minutes, 0.54 g sample was withdrawn, quenched with 0.1 g methanol, and 0.025 g decane was added followed by GC determination of BzMA concentration. The GC showed over 95% BzMA conversion.

The catalyst tetrabutyl ammonium m-chlorobenzoate, 0.13 g of a 1.0 M solution in acetonitrile, was then added. TMS-MAA, 3.53 g (22.3 mmole), was then added. After 55 minutes, BzMA (purified by passing over a column of basic alumina and stored over 3 A sieves), 4.09 g (23.2 mmole), was then added. After 48 minutes, 0.59 g sample was withdrawn, quenched with 0.1 g methanol, and 0.025 g decane was added followed by GC determination of BzMA concentration. The GC showed over 95% BzMA conversion.

The catalyst tetrabutyl ammonium m-chlorobenzoate, 0.13 g of a 1.0 M solution in acetonitrile, was then added. TMS-MAA, 3.53 g (22.3 mmole), was then added. After 61 minutes, BzMA (purified by passing over a column of basic alumina and stored over 3 A sieves), 4.10 g (23.3 mmole), was then added. After 53 minutes, 0.56 g sample was withdrawn, quenched with 0.1 g methanol, and 0.025 g decane was added followed by GC determination of BzMA concentration. The GC showed over 95% BzMA conversion.

The catalyst tetrabutyl ammonium m-chlorobenzoate, 0.13 g of a 1.0 M solution in acetonitrile, was then added. TMS-MAA, 3.53 g (22.3 mmole), was then added. After 49 minutes, BzMA (purified by passing over a column of basic alumina and stored over 3 A sieves), 4.09 g (23.2 mmole), was then added. After 54 minutes, the catalyst tetrabutyl ammonium m-chlorobenzoate, 0.13 g of a 1.0 M solution in acetonitrile, was then added. TMS-MAA, 3.54 g (22.4 mmole), was then added. After 46 minutes, BzMA (purified by passing over a column of basic alumina and stored over 3 A sieves), 4.01 g (22.8 mmole), was then added. After stirring for additional 16 hours, 18 g methanol was added to the reaction mixture to quench the polymer and to convert trimethylsilyl-carboxyl groups into carboxylic groups. The polymer was isolated by removing volatiles from 1.13 g sample in a vacuum oven at 100° C. for 23 hours. 0.35 g sample of polymer was dissolved in 10 ml DMSO (dimethyl sulfoxide), and the acid number (176.5; acid value (AV)=3.15) was determined by titration with 0.1 N KOH in methanol. The polymer had an Mn=2,030, Mw/Mn=1.23 as determined by GPC (SEC) vs. universal calibration in THF at room temperature.

The polymer dispersion/solution was prepared by charging 0.40 g polymer sample; deionized water, 3.5 g; and 50 wt % sodium hydroxide solution, 0.1 g, into a 20 ml glass vial, capped and homogenized by placing into an oven at 90° C. for 7 hours, while occasionally taking the vial out and shaking.

Example 8

Polymer and Polymer Dispersion/Solution Preparation 8 [Undeca-Block MAA-(BzMA-MAA2)5-BzMA Tetrahydrofuran (THF; stored over 3 A sieves), 100 g; 1,1-bis(trimethylsiloxy)-2-methyl-1-propene, 5.04 g (21.7 mmole); and mesitylene, 0.25 g, were charged into a dry glass reactor in a dry-box. The catalyst tetrabutyl ammonium m-chlorobenzoate, 0.13 g of a 1.0 M solution in acetonitrile, was then added. Benzylmethacrylate (BzMA; purified by passing over a column of basic alumina and stored over 3 A sieves), 4.07 g (23.1 mmole), was then added at room temperature. After 61 minutes, 0.54 g sample was withdrawn, quenched with 0.1 g methanol, and 0.025 g decane was added followed by GC determination of BzMA concentration. The GC showed over 95% BzMA conversion.

The catalyst tetrabutyl ammonium m-chlorobenzoate, 0.13 g of a 1.0 M solution in acetonitrile, was then added. Trimethylsilyl methacrylate (TMS-MAA), 7.06 g (44.7 mmole), was then added. After 55 minutes, BzMA (purified by passing over a column of basic alumina and stored over 3 A sieves), 4.08 g (23.2 mmole), was then added. After 47 minutes, 0.55 g sample was withdrawn, quenched with 0.1 g methanol, and 0.025 g decane was added followed by GC determination of BzMA concentration. The GC showed over 95% BzMA conversion.

The catalyst tetrabutyl ammonium m-chlorobenzoate, 0.13 g of a 1.0 M solution in acetonitrile, was then added. TMS-MAA, 7.03 g (44.5 mmole), was then added. After 62 minutes, BzMA (purified by passing over a column of basic alumina and stored over 3 A sieves), 4.06 g (23.0 mmole), was then added. After 81 minutes, 0.65 g sample was withdrawn, quenched with 0.1 g methanol, and 0.025 g decane was added followed by GC determination of BzMA concentration. The GC showed over 95% BzMA conversion.

The catalyst tetrabutyl ammonium m-chlorobenzoate, 0.13 g of a 1.0 M solution in acetonitrile, was then added. TMS-MAA, 7.06 g (44.7 mmole), was then added. After 58 minutes, BzMA (purified by passing over a column of basic alumina and stored over 3 A sieves), 4.07 g (23.1 mmole), was then added. After 47 minutes, 0.57 g sample was withdrawn, quenched with 0.1 g methanol, and 0.025 g decane was added followed by GC determination of BzMA concentration. The GC showed over 95% BzMA conversion.

The catalyst tetrabutyl ammonium m-chlorobenzoate, 0.13 g of a 1.0 M solution in acetonitrile, was then added. TMS-MAA, 7.05 g (44.6 mmole), was then added. After 53 minutes, BzMA (purified by passing over a column of basic alumina and stored over 3 A sieves), 4.07 g (23.1 mmole), was then added. After 188 minutes, the catalyst tetrabutyl ammonium m-chlorobenzoate, 0.13 g of a 1.0 M solution in acetonitrile, was then added. TMS-MAA, 7.01 g (44.4 mmole), was then added. After 54 minutes, BzMA (purified by passing over a column of basic alumina and stored over 3 A sieves), 4.28 g (24.3 mmole), was then added. After stirring for additional 10 hours, 35 g methanol was added to the reaction mixture to quench the polymer and to convert trimethylsilyl-carboxyl groups into carboxylic groups. The polymer was isolated by removing volatiles from 4.07 g sample in a vacuum oven at 100° C. for 23 hours. 0.24 g sample of polymer was dissolved in 10 ml DMSO (dimethyl sulfoxide), and the acid number (237.1; acid value (AV)=4.23) was determined by titration with 0.1 N KOH in methanol. The polymer had an Mn=2,640, Mw/Mn=1.17 as determined by GPC (SEC) vs. universal calibration in THF at room temperature.

The polymer dispersion/solution was prepared by charging 0.40 g polymer sample; deionized water, 1.5 g; and 50 wt % sodium hydroxide solution, 0.14 g, into a 20 ml glass vial, capped and homogenized by placing into an oven at 60° C. for 18 hours, while occasionally taking the vial out and shaking.

Example 9

Polymer and Polymer Dispersion/Solution Preparation 9 [Undeca-Block MAA-(BzMA-MAA3)5-BzMA Tetrahydrofuran (THF; stored over 3 A sieves), 100 g; 1,1-bis(trimethylsiloxy)-2-methyl-1-propene, 5.06 g (21.8 mmole); and mesitylene, 0.25 g, were charged into a dry glass reactor in a dry-box. The catalyst tetrabutyl ammonium m-chlorobenzoate, 0.13 g of a 1.0 M solution in acetonitrile, was then added. Benzylmethacrylate (BzMA; purified by passing over a column of basic alumina and stored over 3 A sieves), 4.08 g (23.2 mmole), was then added at room temperature. After 47 minutes, 0.55 g sample was withdrawn, quenched with 0.1 g methanol, and 0.025 g decane was added followed by GC determination of BzMA concentration. The GC showed over 95% BzMA conversion.

The catalyst tetrabutyl ammonium m-chlorobenzoate, 0.13 g of a 1.0 M solution in acetonitrile, was then added. Trimethylsilyl-methacrylate (TMS-MAA), 10.54 g (66.7 mmole), was then added. After 48 minutes, BzMA (purified by passing over a column of basic alumina and stored over 3 A sieves), 4.08 g (23.2 mmole), was then added. After 48 minutes, 0.54 g sample was withdrawn, quenched with 0.1 g methanol, and 0.025 g decane was added followed by GC determination of BzMA concentration. The GC showed over 95% BzMA conversion.

The catalyst tetrabutyl ammonium m-chlorobenzoate, 0.13 g of a 1.0 M solution in acetonitrile, was then added. TMS-MAA, 10.51 g (66.5 mmole), was then added. After 50 minutes, BzMA (purified by passing over a column of basic alumina and stored over 3 A sieves), 4.06 g (23.0 mmole), was then added. After 57 minutes, 0.59 g sample was withdrawn, quenched with 0.1 g methanol, and 0.025 g decane was added followed by GC determination of BzMA concentration. The GC showed over 95% BzMA conversion.

The catalyst tetrabutyl ammonium m-chlorobenzoate, 0.13 g of a 1.0 M solution in acetonitrile, was then added. TMS-MAA, 10.51 g (66.5 mmole), was then added. After 53 minutes, BzMA (purified by passing over a column of basic alumina and stored over 3 A sieves), 4.05 g (23.0 mmole), was then added. After 49 minutes, 0.54 g sample was withdrawn, quenched with 0.1 g methanol, and 0.025 g decane was added followed by GC determination of BzMA concentration. The GC showed over 95% BzMA conversion.

The catalyst tetrabutyl ammonium m-chlorobenzoate, 0.13 g of a 1.0 M solution in acetonitrile, was then added. TMS-MAA, 10.53 g (66.6 mmole), was then added. After 49 minutes, BzMA (purified by passing over a column of basic alumina and stored over 3 A sieves), 4.07 g (23.1 mmole), was then added. After 48 minutes, 0.53 g sample was withdrawn, quenched with 0.1 g methanol, and 0.025 g decane was added followed by GC determination of BzMA concentration. The GC showed over 95% BzMA conversion.

The catalyst tetrabutyl ammonium m-chlorobenzoate, 0.13 g of a 1.0 M solution in acetonitrile, was then added. TMS-MAA, 10.52 g (66.6 mmole), was then added. After 53 minutes, BzMA (purified by passing over a column of basic alumina and stored over 3 A sieves), 4.09 g (23.2 mmole), was then added. After stirring for additional 16 hours, 53 g methanol was added to the reaction mixture to quench the polymer and to convert trimethylsilylcarboxyl groups into carboxylic groups. The polymer was isolated by removing volatiles from 1.08 g sample in a vacuum oven at 100° C. for 23 hours. 0.24 g sample of polymer was dissolved in 10 ml DMSO (dimethyl sulfoxide), and the acid number (300.9; acid value (AV)= 5.37) was determined by titration with 0.1 N KOH in methanol. The polymer had an Mn=3,060, Mw/Mn=1.18 as determined by GPC (SEC) vs. universal calibration in THF at room temperature.

The polymer dispersion/solution was prepared by charging 0.40 g polymer sample; deionized water, 1.5 g; and 50 wt % sodium hydroxide solution, 0.17 g, into a 20 ml glass vial, capped and homogenized by placing into an oven at 90° C. for 7 hours, while occasionally taking the vial out and shaking.

Example 10

Polymer and Polymer Dispersion/Solution Preparation 10 [Undeca-Block MAA-(BzMA2-MAA2)5-BzMA Tetrahydrofuran (THF; stored over 3 A sieves), 20 g; 1,1-bis(trimethylsiloxy)-2-methyl-1-propene, 1.02 g (4.40 mmole); and mesitylene, 0.05 g, were charged into the dry glass reactor in a dry-box. The catalyst tetrabutyl ammonium m-chlorobenzoate, 0.025 g of a 1.0 M solution in acetonitrile, was then added. Benzylmethacrylate (BzMA; purified by passing over a column of basic alumina and stored over 3 A sieves), 1.65 g (9.36 mmole), was then added at room temperature. After 50 minutes, 0.53 g sample was withdrawn, quenched with 0.1 g methanol, and 0.025 g decane was added followed by GC determination of BzMA concentration. The GC showed over 95% BzMA conversion.

The catalyst tetrabutyl ammonium m-chlorobenzoate, 0.025 g of a 1.0 M solution in acetonitrile, was then added. Trimethylsilyl methacrylate (TMS-MAA), 1.42 g (8.99 mmole), was then added. After 49 minutes, BzMA (purified by passing over a column of basic alumina and stored over 3 A sieves), 1.56 g (8.85 mmole), was then added. After 51 minutes, 0.52 g sample was withdrawn, quenched with 0.1 g methanol, and 0.025 g decane was added followed by GC determination of BzMA concentration. The GC showed over 95% BzMA conversion.

The catalyst tetrabutyl ammonium m-chlorobenzoate, 0.025 g of a 1.0 M solution in acetonitrile, was then added. TMS-MAA, 1.45 g (9.18 mmole), was then added. After 71 minutes, BzMA (purified by passing over a column of basic alumina and stored over 3 A sieves), 1.58 g (8.97 mmole), was then added. After 62 minutes, 0.53 g sample was withdrawn, quenched with 0.1 g methanol, and 0.025 g decane was added followed by GC determination of BzMA concentration. The GC showed over 95% BzMA conversion.

The catalyst tetrabutyl ammonium m-chlorobenzoate, 0.025 g of a 1.0 M solution in acetonitrile, was then added. TMS-MAA, 1.43 g (9.05 mmole), was then added. After 51 minutes, BzMA (purified by passing over a column of basic alumina and stored over 3 A sieves), 1.63 g (9.25 mmole), was then added. After 58 minutes, 0.53 g sample was withdrawn, quenched with 0.1 g methanol, and 0.025 g decane was added followed by GC determination of BzMA concentration. The GC showed over 95% BzMA conversion.

The catalyst tetrabutyl ammonium m-chlorobenzoate, 0.025 g of a 1.0 M solution in acetonitrile, was then added. TMS-MAA, 1.43 g (9.05 mmole), was then added. After 56 minutes, BzMA (purified by passing over a column of basic alumina and stored over 3 A sieves), 1.62 g (9.19 mmole), was then added. After 39 minutes, the catalyst tetrabutyl ammonium m-chlorobenzoate, 0.025 g of a 1.0 M solution in acetonitrile, was then added. TMS-MAA, 1.40 g (8.86 mmole), was then added. After 189 minutes, BzMA (purified by passing over a column of basic alumina and stored over 3 A sieves), 1.65 g (9.36 mmole), was then added. After stirring for additional 12 hours, 7 g methanol was added to the reaction mixture to quench the polymer and to convert trimethylsilylcarboxyl groups into carboxylic groups. The polymer was isolated by removing volatiles from 1.16 g sample in a vacuum oven at 100° C. for 23 hours. 0.21 g sample of polymer was dissolved in 10 ml DMSO (dimethyl sulfoxide), and the acid number (152.2; acid value (AV)=2.72) was determined by titration with 0.1 N KOH in methanol. The polymer had an Mn=3,940, Mw/Mn=1.21 as determined by GPC (SEC) vs. universal calibration in THF at room temperature.

The polymer dispersion/solution was prepared by charging 0.40 g polymer sample; deionized water, 1.5 g; and 50 wt % sodium hydroxide solution, 0.09 g, into a 20 ml glass vial, capped and homogenized by placing into an oven at 60° C. for 7 hours, while occasionally taking the vial out and shaking. 2.0 g deionized water was added to make 10 wt % polymer solution/dispersion.

Example 11

Polymer and Polymer Dispersion/Solution Preparation 11 [Undeca-Block MAA-(BzMA2-MAA4)5-BzMA Tetrahydrofuran (THF; stored over 3 A sieves), 20 g; 1,1-bis(trimethylsiloxy)-2-methyl-1-propene, 1.11 g (4.78 mmole); and mesitylene, 0.05 g, were charged into a dry glass reactor in a dry-box. The catalyst tetrabutyl ammonium m-chlorobenzoate, 0.025 g of a 1.0 M solution in acetonitrile, was then added. Benzylmethacrylate (BzMA; purified by passing over a column of basic alumina and stored over 3 A sieves), 1.65 g (9.36 mmole), was then added at room temperature. After 66 minutes, 0.53 g sample was withdrawn, quenched with 0.1 g methanol, and 0.025 g decane was added followed by GC determination of BzMA concentration. The GC showed over 95% BzMA conversion.

The catalyst tetrabutyl ammonium m-chlorobenzoate, 0.025 g of a 1.0 M solution in acetonitrile, was then added. Trimethylsilyl methacrylate (TMS-MAA), 2.87 g (18.2 mmole), was then added. After 62 minutes, BzMA (purified by passing over a column of basic alumina and stored over 3 A sieves), 1.65 g (9.36 mmole), was then added. After 49 minutes, 0.53 g sample was withdrawn, quenched with 0.1 g methanol, and 0.025 g decane was added followed by GC determination of BzMA concentration. The GC showed over 95% BzMA conversion.

The catalyst tetrabutyl ammonium m-chlorobenzoate, 0.025 g of a 1.0 M solution in acetonitrile, was then added. TMS-MAA, 2.84 g (18.0 mmole), was then added. After 58 minutes, BzMA (purified by passing over a column of basic alumina and stored over 3 A sieves), 1.65 g (9.36 mmole), was then added. After 56 minutes, 0.56 g sample was withdrawn, quenched with 0.1 g methanol, and 0.025 g decane was added followed by GC determination of BzMA concentration. The GC showed over 95% BzMA conversion.

The catalyst tetrabutyl ammonium m-chlorobenzoate, 0.025 g of a 1.0 M solution in acetonitrile, was then added. TMS-MAA, 2.85 g (18.0 mmole), was then added. After 44 minutes, BzMA (purified by passing over a column of basic alumina and stored over 3 A sieves), 1.65 g (9.36 mmole), was then added. After 185 minutes, the catalyst tetrabutyl ammonium m-chlorobenzoate, 0.025 g of a 1.0 M solution in acetonitrile, was added. TMS-MAA, 2.85 g (18.0 mmole), was then added. After 34 minutes, BzMA (purified by passing over a column of basic alumina and stored over 3 A sieves), 1.62 g (9.19 mmole), was then added. After 23 minutes, the catalyst tetrabutyl ammonium m-chlorobenzoate, 0.025 g of a 1.0 M solution in acetonitrile, was then added. TMS-MAA, 2.83 g (16.1 mmole), was then added. After 45 minutes, BzMA (purified by passing over a column of basic alumina and stored over 3 A sieves), 1.61 g (9.14 mmole), was then added. After stirring for additional 11 hours, 14 g methanol was added to the reaction mixture to quench the polymer and to convert trimethylsilylcarboxyl groups into carboxylic groups. The polymer was isolated by removing volatiles from 1.18 g sample in a vacuum oven at 100° C. for 23 hours. 0.21 g sample of polymer was dissolved in 10 ml DMSO (dimethyl sulfoxide), and the acid number (230.1; acid value (AV)= 4.11) was determined by titration with 0.1 N KOH in methanol. The polymer had an Mn=4,810, Mw/Mn=1.16 as determined by GPC (SEC) vs. universal calibration in THF at room temperature.

The polymer dispersion/solution was prepared by charging 0.40 g polymer sample; deionized water, 1.5 g; and 50 wt % sodium hydroxide solution, 0.137 g, into a 20 ml glass vial, capped and homogenized by placing into an oven at 60° C. for 7 hours, while occasionally taking the vial out and shaking. 2.0 g deionized water was added to make 10 wt % polymer solution/dispersion.

Comparative Example 12

Polymer and Polymer Dispersion/Solution Preparation 12 [Random Copolymer MAA-BzMA37/MAA30

Tetrahydrofuran (THF; stored over 3 A sieves), 30 g; 1,1-bis(trimethylsiloxy)-2-methyl-1-propene, 0.52 g (2.24 mmole); and mesitylene, 0.05 g, were charged into a dry glass reactor in a dry-box. The catalyst tetrabutyl ammonium m-chlorobenzoate, 0.025 g of a 1.0 M solution in acetonitrile, was then added. Benzylmethacrylate (BzMA; purified by passing over a column of basic alumina and stored over 3 A sieves), 14.46 g (82.1 mmole), and trimethylsilyl methacrylate (TMS-MAA), 10.57 g (66.9 mmole), were pre-mixed. A 6.27 g portion of the pre-mixed comonomer mixture was then added at room temperature. After 48 minutes, the catalyst tetrabutyl ammonium m-chlorobenzoate, 0.025 g of a 1.0 M solution in acetonitrile, was added. Another 6.31 g of the pre-mixed comonomer mixture was then added. After 51 minutes, the catalyst tetrabutyl ammonium m-chlorobenzoate, 0.025 g of a 1.0 M solution in acetonitrile, was added. Another 6.24 g of the pre-mixed comonomer mixture was then added. After 49 minutes, the catalyst tetrabutyl ammonium m-chlorobenzoate, 0.025 g of a 1.0 M solution in acetonitrile, was added. The remaining 5.94 g of the pre-mixed comonomer mixture was then added. After stirring for additional 11 hours, 10.5 g methanol was added to the reaction mixture to quench the polymer and to convert trimethylsilylcarboxyl groups into carboxylic groups. The polymer was isolated by removing volatiles from 1.18 g sample in a vacuum oven at 100° C. for 24 hours. 0.24 g sample of polymer was dissolved in 10 ml DMSO (dimethyl sulfoxide), and the acid number (175.2; acid value (AV)=3.13) was determined by titration with 0.1 N KOH in methanol. The polymer had an Mn=8,360, Mw/Mn=1.17 as determined by GPC (SEC) vs. universal calibration in THF at room temperature.

The polymer dispersion/solution was prepared by charging 0.6 g polymer sample; deionized water, 2.25 g; and 50 wt % sodium hydroxide solution, 0.16 g into a 20 ml glass vial, capped and homogenized by placing into an oven at 60° C. for 26 hours, while occasionally taking the vial out and shaking. The volatiles were removed in a vacuum oven at 90° C. for 16 hours. To the 0.55 g residue, 4.5 g deionized water was added to make ~10 wt % polymer solution/dispersion.

Comparative Example 13

Polymer and Polymer Dispersion/Solution Preparation 13 [Random Copolymer MAA-BzMA35/MAA58

Tetrahydrofuran (THF; stored over 3 A sieves), 30 g; 1,1-bis(trimethylsiloxy)-2-methyl-1-propene, 0.54 g (2.33 mmole); and mesitylene, 0.05 g, were charged into a dry glass reactor in a dry-box. The catalyst tetrabutyl ammonium m-chlorobenzoate, 0.025 g of a 1.0 M solution in acetonitrile, was then added. Benzylmethacrylate (BzMA; purified by passing over a column of basic alumina and stored over 3 A sieves), 14.57 g (82.7 mmole), and trimethylsilyl methacrylate (TMS-MAA), 21.17 g (134.0 mmole), were pre-mixed. An 8.93 g portion of the pre-mixed comonomer mixture was then added at room temperature. After 51 minutes, the catalyst tetrabutyl ammonium m-chlorobenzoate, 0.025 g of a 1.0 M solution in acetonitrile, was added. Another 9.13 g of the pre-mixed comonomer mixture was then added. After 50 minutes, the catalyst tetrabutyl ammonium m-chlorobenzoate, 0.025 g of a 1.0 M solution in acetonitrile, was added. Another 8.91 g of the pre-mixed comonomer mixture was then added. After 49 minutes, the catalyst tetrabutyl ammonium m-chlorobenzoate, 0.025 g of a 1.0 M solution in acetonitrile, was added. The remaining 8.48 g of the pre-mixed comonomer mixture was then added. After stirring for additional 67 hours, 21 g methanol was added to the reaction mixture to quench the polymer and to convert trimethylsilyl-carboxyl groups into carboxylic groups. The polymer was isolated by removing volatiles from 1.26 g sample in a vacuum oven at 90° C. for 24 hours. 0.24 g sample of polymer was dissolved in 10 ml DMSO (dimethyl sulfoxide), and the acid number (233.0; acid value (AV)=4.16) was determined by titration with 0.1 N KOH in methanol. The polymer had an Mn=10,010, Mw/Mn=1.25 as determined by GPC (SEC) vs. universal calibration in THF at room temperature.

The polymer dispersion/solution was prepared by charging 0.6 g polymer sample; deionized water, 2.25 g; and 50 wt % sodium hydroxide solution, 0.21 g, into a 20 ml glass vial, capped and homogenized by placing into an oven at 60° C. for 26 hours, while occasionally taking the vial out and shaking. The volatiles were removed in a vacuum oven at 90° C. for 16 hours. To the 0.63 g residue, 5.0 g deionized water was added to make ~10 wt % polymer solution/dispersion.

Example 14

Polymer and Polymer Dispersion/Solution Preparation 14 [Heptadeca-Block MAA-(BzMA-MAA)8-BzMA Tetrahydrofuran (THF; stored over 3 A sieves), 20 g; 1,1-bis(trimethylsiloxy)-2-methyl-1-propene, 1.03 g (4.44 mmole); and mesitylene, 0.05 g, were charged into a dry glass reactor in a dry-box. The catalyst tetrabutyl ammonium m-chlorobenzoate, 0.025 g of a 1.0 M solution in acetonitrile, was then added. Benzylmethacrylate (BzMA; purified by passing over a column of basic alumina and stored over 3 A sieves), 0.81 g (4.60 mmole), was then added at room temperature. After 33 minutes, 0.12 g sample was withdrawn, quenched with 0.03 g methanol, and 0.025 g decane was added followed by GC determination of BzMA concentration. The GC showed over 95% BzMA conversion.

The catalyst tetrabutyl ammonium m-chlorobenzoate, 0.025 g of a 1.0 M solution in acetonitrile, was then added. Trimethylsilyl methacrylate (TMS-MAA), 0.70 g (4.43 mmole), was then added. After 32 minutes, BzMA (purified by passing over a column of basic alumina and stored over 3 A sieves), 0.81 g (4.60 mmole), was then added. After 33 minutes, 0.12 g sample was withdrawn, quenched with 0.03 g methanol, and 0.025 g decane was added followed by GC determination of BzMA concentration. The GC showed over 95% BzMA conversion.

The catalyst tetrabutyl ammonium m-chlorobenzoate, 0.025 g of a 1.0 M solution in acetonitrile, was then added. TMS-MAA, 0.72 g (4.56 mmole), was then added. After 37 minutes, BzMA (purified by passing over a column of basic alumina and stored over 3 A sieves), 0.83 g (4.71 mmole), was then added. After 33 minutes, 0.20 g sample was withdrawn, quenched with 0.03 g methanol, and 0.025 g decane was added followed by GC determination of BzMA concentration. The GC showed over 95% BzMA conversion.

The catalyst tetrabutyl ammonium m-chlorobenzoate, 0.025 g of a 1.0 M solution in acetonitrile, was then added. TMS-MAA, 0.73 g (4.62 mmole), was then added. After 31 minutes, BzMA (purified by passing over a column of basic alumina and stored over 3 A sieves), 0.82 g (4.65 mmole), was then added. After 35 minutes, 0.15 g sample was withdrawn, quenched with 0.03 g methanol, and 0.025 g decane was added followed by GC determination of BzMA concentration. The GC showed over 95% BzMA conversion.

The catalyst tetrabutyl ammonium m-chlorobenzoate, 0.025 g of a 1.0 M solution in acetonitrile, was then added. TMS-MAA, 0.72 g (4.56 mmole), was then added. After 33 minutes, BzMA (purified by passing over a column of basic alumina and stored over 3 A sieves), 0.81 g (4.60 mmole), was then added. After 32 minutes, 0.16 g sample was withdrawn, quenched with 0.03 g methanol, and 0.025 g decane was added followed by GC determination of BzMA concentration. The GC showed over 95% BzMA conversion.

The catalyst tetrabutyl ammonium m-chlorobenzoate, 0.025 g of a 1.0 M solution in acetonitrile, was then added. TMS-MAA, 0.71 g (4.49 mmole), was then added. After 34 minutes, BzMA (purified by passing over a column of basic alumina and stored over 3 A sieves), 0.82 g (4.65 mmole), was added. After 35 minutes, 0.15 g sample was withdrawn, quenched with 0.03 g methanol, and 0.025 g decane was added followed by GC determination of BzMA concentration. The GC showed over 95% BzMA conversion.

The catalyst tetrabutyl ammonium m-chlorobenzoate, 0.025 g of a 1.0 M solution in acetonitrile, was then added. TMS-MAA, 0.71 g (4.49 mmole), was then added. After 31 minutes, BzMA (purified by passing over a column of basic alumina and stored over 3 A sieves), 0.80 g (4.78 mmole), was added. After 31 minutes, 0.15 g sample was withdrawn, quenched with 0.03 g methanol, and 0.025 g decane was added followed by GC determination of BzMA concentration. The GC showed over 95% BzMA conversion.

The catalyst tetrabutyl ammonium m-chlorobenzoate, 0.025 g of a 1.0 M solution in acetonitrile, was then added. TMS-MAA, 0.71 g (4.49 mmole), was then added. After 22 minutes, BzMA (purified by passing over a column of basic alumina and stored over 3 A sieves), 0.82 g (4.65 mmole), was added. After 266 minutes, the catalyst tetrabutyl ammonium m-chlorobenzoate, 0.025 g of a 1.0 M solution in acetonitrile, was added. TMS-MAA, 0.72 g (4.56 mmole), was then added. After 31 minutes, BzMA (purified by passing over a column of basic alumina and stored over 3 A sieves), 0.81 g (4.60 mmole), was added. After stirring for additional 12 hours, 6 g methanol was added to the reaction mixture to quench the polymer and to convert trimethylsilylcarboxyl groups into carboxylic groups. The polymer was isolated by removing volatiles in a vacuum oven at 90° C. for 23 hours. 0.23 g sample of polymer was dissolved in 10 ml DMSO (dimethyl sulfoxide), and the acid number (182.9; acid value (AV)=3.27) was determined by titration with 0.1 N KOH in methanol. The polymer had an Mn=2,760, Mw/Mn=1.21 as determined by GPC (SEC) vs. universal calibration in THF at room temperature.

The polymer dispersion/solution was prepared by charging 0.40 g polymer sample; deionized water, 3.5 g; and 50 wt % sodium hydroxide solution, 0.103 g, into a 20 ml glass vial, capped and homogenized by placing into an oven at 65° C. for 7 hours, while occasionally taking the vial out and shaking.

Example 15

Polymer and Polymer Dispersion/Solution Preparation 15 [Heptadeca-Block MAA-(BzMA-MAA2)8-BzMA Tetrahydrofuran (THF; stored over 3 A sieves), 20 g; 1,1-bis(trimethylsiloxy)-2-methyl-1-propene, 1.04 g (4.48 mmole); and mesitylene, 0.05 g, were charged into a dry glass reactor in a dry-box. The catalyst tetrabutyl ammonium m-chlorobenzoate, 0.025 g of a 1.0 M solution in acetonitrile, was then added. Benzylmethacrylate (BzMA; purified by passing over a column of basic alumina and stored over 3 A sieves), 0.81 g (4.60 mmole), was then added at room temperature. After 34 minutes, 0.13 g sample was withdrawn, quenched with 0.03 g methanol, and 0.025 g decane was added followed by GC determination of BzMA concentration. The GC showed over 95% BzMA conversion.

The catalyst tetrabutyl ammonium m-chlorobenzoate, 0.025 g of a 1.0 M solution in acetonitrile, was then added. Trimethylsilyl methacrylate (TMS-MAA), 1.4 g (8.86 mmole), was then added. After 33 minutes, BzMA (purified by passing over a column of basic alumina and stored over 3 A sieves), 0.80 g (4.54 mmole), was then added. After 32 minutes, 0.10 g sample was withdrawn, quenched with 0.03 g methanol, and 0.025 g decane was added followed by GC determination of BzMA concentration. The GC showed over 95% BzMA conversion.

The catalyst tetrabutyl ammonium m-chlorobenzoate, 0.025 g of a 1.0 M solution in acetonitrile, was then added. TMS-MAA, 1.4 g (8.86 mmole), was then added. After 37 minutes, BzMA (purified by passing over a column of basic alumina and stored over 3 A sieves), 0.82 g (4.65 mmole), was then added. After 32 minutes, 0.10 g sample was withdrawn, quenched with 0.03 g methanol, and 0.025 g decane was added followed by GC determination of BzMA concentration. The GC showed over 95% BzMA conversion.

The catalyst tetrabutyl ammonium m-chlorobenzoate, 0.025 g of a 1.0 M solution in acetonitrile, was then added. TMS-MAA, 1.42 g (8.99 mmole), was then added. After 31 minutes, BzMA (purified by passing over a column of basic alumina and stored over 3 A sieves), 0.81 g (4.60 mmole), was then added. After 35 minutes, 0.11 g sample was withdrawn, quenched with 0.03 g methanol, and 0.025 g decane was added followed by GC determination of BzMA concentration. The GC showed over 95% BzMA conversion.

The catalyst tetrabutyl ammonium m-chlorobenzoate, 0.025 g of a 1.0 M solution in acetonitrile, was then added. TMS-MAA, 1.41 g (8.92 mmole), was then added. After 33 minutes, BzMA (purified by passing over a column of basic alumina and stored over 3 A sieves), 0.82 g (4.65 mmole), was then added. After 32 minutes, 0.13 g sample was withdrawn, quenched with 0.03 g methanol, and 0.025 g decane was added followed by GC determination of BzMA concentration. The GC showed over 95% BzMA conversion.

The catalyst tetrabutyl ammonium m-chlorobenzoate, 0.025 g of a 1.0 M solution in acetonitrile, was then added. TMS-MAA, 1.4 g (8.86 mmole), was then added. After 33 minutes, BzMA (purified by passing over a column of basic alumina and stored over 3 A sieves), 0.82 g (4.65 mmole), was added. After 35 minutes, 0.15 g sample was withdrawn, quenched with 0.03 g methanol, and 0.025 g decane was added followed by GC determination of BzMA concentration. The GC showed over 95% BzMA conversion.

The catalyst tetrabutyl ammonium m-chlorobenzoate, 0.025 g of a 1.0 M solution in acetonitrile, was then added. TMS-MAA, 1.41 g (8.92 mmole), was then added. After 32 minutes, BzMA (purified by passing over a column of basic alumina and stored over 3 A sieves), 0.81 g (4.60 mmole), was added. After 30 minutes, 0.13 g sample was withdrawn, quenched with 0.03 g methanol, and 0.025 g decane was added followed by GC determination of BzMA concentration. The GC showed over 95% BzMA conversion.

The catalyst tetrabutyl ammonium m-chlorobenzoate, 0.025 g of a 1.0 M solution in acetonitrile, was then added. TMS-MAA, 1.4 g (8.86 mmole), was then added. After 22 minutes, BzMA (purified by passing over a column of basic alumina and stored over 3 A sieves), 0.83 g (4.71 mmole), was added. After 265 minutes, the catalyst tetrabutyl ammonium m-chlorobenzoate, 0.025 g of a 1.0 M solution in acetonitrile, was added. TMS-MAA, 1.4 g (8.86 mmole), was then added. After 31 minutes, BzMA (purified by passing over a column of basic alumina and stored over 3 A sieves), 0.81 g (4.60 mmole), was added. After stirring for additional 12 hours, 11 g methanol was added to the reaction mixture to quench the polymer and to convert trimethylsilylcarboxyl groups into carboxylic groups. The polymer was isolated by removing volatiles in a vacuum oven at 90° C. for 23 hours. 0.22 g sample of polymer was dissolved in 10 ml DMSO (dimethyl sulfoxide), and the acid number (251.5; acid value (AV)= 4.49) was determined by titration with 0.1 N KOH in methanol. The polymer had an Mn=3,510, Mw/Mn=1.18 as determined by GPC (SEC) vs. universal calibration in THF at room temperature.

The polymer dispersion/solution was prepared by charging 0.40 g polymer sample; deionized water, 3.5 g; and 50 wt % sodium hydroxide solution, 0.15 g, into a 20 ml glass vial, capped and homogenized by placing into an oven at 65° C. for 7 hours, while occasionally taking the vial out and shaking.

Example 16

Polymer and Polymer Dispersion/Solution Preparation 16 [Multi-Block MAA-(BzMA-MAA)13-BzMA Tetrahydrofuran (THF; stored over 3 A sieves), 20 g; 1,1-bis(trimethylsiloxy)-2-methyl-1-propene, 1.03 g (4.44 mmole); and mesitylene, 0.05 g, were charged into a dry glass reactor in a dry-box. The catalyst tetrabutyl ammonium m-chlorobenzoate, 0.025 g of a 1.0 M solution in acetonitrile, was then added. Benzylmethacrylate (BzMA; purified by passing over a column of basic alumina and stored over 3 A sieves), 0.83 g (4.71 mmole), was then added at room temperature. After 22 minutes, 0.13 g sample was withdrawn, quenched with 0.03 g methanol, and 0.025 g decane was added followed by GC determination of BzMA concentration. The GC showed over 95% BzMA conversion.

The catalyst tetrabutyl ammonium m-chlorobenzoate, 0.025 g of a 1.0 M solution in acetonitrile, was then added. Trimethylsilyl methacrylate (TMS-MAA), 0.73 g (4.62 mmole), was then added. After 22 minutes, BzMA (purified by passing over a column of basic alumina and stored over 3 A sieves), 0.74 g (4.20 mmole), was then added. After 22 minutes, 0.19 g sample was withdrawn, quenched with 0.03 g methanol, and 0.025 g decane was added followed by GC determination of BzMA concentration. The GC showed over 95% BzMA conversion.

The catalyst tetrabutyl ammonium m-chlorobenzoate, 0.025 g of a 1.0 M solution in acetonitrile, was then added. TMS-MAA, 0.70 g (4.43 mmole), was then added. After 23 minutes, BzMA (purified by passing over a column of basic alumina and stored over 3 A sieves), 0.82 g (4.65 mmole), was then added. After 21 minutes, 0.17 g sample was withdrawn, quenched with 0.03 g methanol, and 0.025 g decane was added followed by GC determination of BzMA concentration. The GC showed over 95% BzMA conversion.

The catalyst tetrabutyl ammonium m-chlorobenzoate, 0.025 g of a 1.0 M solution in acetonitrile, was then added. TMS-MAA, 0.74 g (4.68 mmole), was then added. After 23 minutes, BzMA (purified by passing over a column of basic alumina and stored over 3 A sieves), 0.89 g (5.05 mmole), was then added. After 22 minutes, 0.12 g sample was withdrawn, quenched with 0.03 g methanol, and 0.025 g decane was added followed by GC determination of BzMA concentration. The GC showed over 95% BzMA conversion.

The catalyst tetrabutyl ammonium m-chlorobenzoate, 0.025 g of a 1.0 M solution in acetonitrile, was then added. TMS-MAA, 0.77 g (4.87 mmole), was then added. After 24 minutes, BzMA (purified by passing over a column of basic alumina and stored over 3 A sieves), 0.82 g (4.65 mmole), was then added. After 19 minutes, the catalyst tetrabutyl ammonium m-chlorobenzoate, 0.025 g of a 1.0 M solution in acetonitrile, was then added. TMS-MAA, 0.71 g (4.49 mmole), was then added. After 26 minutes, BzMA (purified by passing over a column of basic alumina and stored over 3 A sieves), 0.87 g (4.94 mmole), was added. After 22 minutes, 0.12 g sample was withdrawn, quenched with 0.03 g methanol, and 0.025 g decane was added followed by GC determination of BzMA concentration. The GC showed over 95% BzMA conversion.

The catalyst tetrabutyl ammonium m-chlorobenzoate, 0.025 g of a 1.0 M solution in acetonitrile, was then added. TMS-MAA, 0.73 g (4.62 mmole), was then added. After 25 minutes, BzMA (purified by passing over a column of basic alumina and stored over 3 A sieves), 0.84 g (4.77 mmole), was added. After 23 minutes, 0.13 g sample was withdrawn, quenched with 0.03 g methanol, and 0.025 g decane was added followed by GC determination of BzMA concentration. The GC showed over 95% BzMA conversion.

The catalyst tetrabutyl ammonium m-chlorobenzoate, 0.025 g of a 1.0 M solution in acetonitrile, was then added. TMS-MAA, 0.74 g (4.68 mmole), was then added. After 24 minutes, BzMA (purified by passing over a column of basic alumina and stored over 3 A sieves), 0.90 g (5.11 mmole), was added. After 23 minutes, 0.18 g sample was withdrawn, quenched with 0.03 g methanol, and 0.025 g decane was added followed by GC determination of BzMA concentration. The GC showed over 95% BzMA conversion.

The catalyst tetrabutyl ammonium m-chlorobenzoate, 0.025 g of a 1.0 M solution in acetonitrile, was then added. TMS-MAA, 0.76 g (4.81 mmole), was then added. After 23 minutes, BzMA (purified by passing over a column of basic alumina and stored over 3 A sieves), 0.86 g (4.88 mmole), was added. After 25 minutes, 0.12 g sample was withdrawn, quenched with 0.03 g methanol, and 0.025 g decane was added followed by GC determination of BzMA concentration. The GC showed over 95% BzMA conversion.

The catalyst tetrabutyl ammonium m-chlorobenzoate, 0.025 g of a 1.0 M solution in acetonitrile, was then added. TMS-MAA, 0.73 g (4.62 mmole), was then added. After 25 minutes, BzMA (purified by passing over a column of basic alumina and stored over 3 A sieves), 0.89 g (5.05 mmole), was added. After 21 minutes, the catalyst tetrabutyl ammonium m-chlorobenzoate, 0.025 g of a 1.0 M solution in acetonitrile, was then added. TMS-MAA, 0.72 g (4.56 mmole), was then added. After 24 minutes, BzMA (purified by passing over a column of basic alumina and stored over 3 A sieves), 0.81 g (4.60 mmole), was added. After 220 minutes, the catalyst tetrabutyl ammonium m-chlorobenzoate, 0.025 g of a 1.0 M solution in acetonitrile, was added. TMS-MAA, 0.71 g (4.49 mmole), was then added. After 32 minutes, BzMA (purified by passing over a column of basic alumina and stored over 3 A sieves), 0.81 g (4.60 mmole), was added. After 17 minutes, the catalyst tetrabutyl ammonium m-chlorobenzoate, 0.025 g of a 1.0 M solution in acetonitrile, was added. TMS-MAA, 0.71 g (4.49 mmole), was then added. After 16 minutes, BzMA (purified by passing over a column of basic alumina and stored over 3 A sieves), 0.81 g (4.60 mmole), was added. After 18 minutes, the catalyst tetrabutyl ammonium m-chlorobenzoate, 0.025 g of a 1.0 M solution in acetonitrile, was added. TMS-MAA, 0.71 g (4.49 mmole), was then added. After 21 minutes, BzMA (purified by passing over a column of basic alumina and stored over 3 A sieves), 0.82 g (4.65 mmole), was added. After stirring for additional 11 hours, 9.5 g methanol was added to the reaction mixture to quench the polymer and to convert trimethylsilylcarboxyl groups into carboxylic groups. The polymer was isolated by removing volatiles in a vacuum oven at 90° C. for 23 hours. 0.27 g sample of polymer was dissolved in 10 ml DMSO (dimethyl sulfoxide), and the acid number (179.8; acid value (AV)=3.21) was determined by titration with 0.1 N KOH in methanol. The polymer had an Mn=4,530, Mw/Mn=1.17 as determined by GPC (SEC) vs. universal calibration in THF at room temperature.

The polymer dispersion/solution was prepared by charging 0.40 g polymer sample; deionized water, 3.5 g; and 50 wt % sodium hydroxide solution, 0.10 g, into a 20 ml glass vial, capped and homogenized by placing into an oven at 65° C. for 7 hours, while occasionally taking the vial out and shaking.

Example 17

Polymer and Polymer Dispersion/Solution Preparation 17 (Multi-Block MAA-(BzMA-MAA2)13-BzMA Tetrahydrofuran (THF; stored over 3 A sieves), 20 g; 1,1-bis(trimethylsiloxy)-2-methyl-1-propene, 1.03 g (4.44 mmole); and mesitylene, 0.05 g, were charged into a dry glass reactor in a dry-box. The catalyst tetrabutyl ammonium m-chlorobenzoate, 0.025 g of a 1.0 M solution in acetonitrile, was then added. Benzylmethacrylate (BzMA; purified by passing over a column of basic alumina and stored over 3 A sieves), 0.77 g (4.37 mmole), was then added at room temperature. After 22 minutes, 0.18 g sample was withdrawn, quenched with 0.03 g methanol, and 0.025 g decane was added followed by GC determination of BzMA concentration. The GC showed over 95% BzMA conversion.

The catalyst tetrabutyl ammonium m-chlorobenzoate, 0.025 g of a 1.0 M solution in acetonitrile, was then added. Trimethylsilyl methacrylate (TMS-MAA), 1.44 g (9.11 mmole), was then added. After 22 minutes, BzMA (purified by passing over a column of basic alumina and stored over 3 A sieves), 0.70 g (3.97 mmole), was then added. After 22 minutes, 0.19 g sample was withdrawn, quenched with 0.03 g methanol, and 0.025 g decane was added followed by GC determination of BzMA concentration. The GC showed over 95% BzMA conversion.

The catalyst tetrabutyl ammonium m-chlorobenzoate, 0.025 g of a 1.0 M solution in acetonitrile, was then added. TMS-MAA, 1.44 g (9.11 mmole), was then added. After 23 minutes, BzMA (purified by passing over a column of basic alumina and stored over 3 A sieves), 0.78 g (4.43 mmole), was then added. After 21 minutes, 0.16 g sample was withdrawn, quenched with 0.03 g methanol, and 0.025 g decane was added followed by GC determination of BzMA concentration. The GC showed over 95% BzMA conversion.

The catalyst tetrabutyl ammonium m-chlorobenzoate, 0.025 g of a 1.0 M solution in acetonitrile, was then added. TMS-MAA, 1.47 g (9.30 mmole), was then added. After 23 minutes, BzMA (purified by passing over a column of basic alumina and stored over 3 A sieves), 0.88 g (4.99 mmole), was then added. After 22 minutes, 0.17 g sample was withdrawn, quenched with 0.03 g methanol, and 0.025 g decane was added followed by GC determination of BzMA concentration. The GC showed over 95% BzMA conversion.

The catalyst tetrabutyl ammonium m-chlorobenzoate, 0.025 g of a 1.0 M solution in acetonitrile, was then added. TMS-MAA, 1.44 g (9.11 mmole), was then added. After 24 minutes, BzMA (purified by passing over a column of basic alumina and stored over 3 A sieves), 0.81 g (4.60 mmole), was then added. After 18 minutes, the catalyst tetrabutyl ammonium m-chlorobenzoate, 0.025 g of a 1.0 M solution in acetonitrile, was added. TMS-MAA, 1.41 g (8.92 mmole), was then added. After 27 minutes, BzMA (purified by passing over a column of basic alumina and stored over 3 A sieves), 0.85 g (4.82 mmole), was added. After 21 minutes, 0.17 g sample was withdrawn, quenched with 0.03 g methanol, and 0.025 g decane was added followed by GC determination of BzMA concentration. The GC showed over 95% BzMA conversion.

The catalyst tetrabutyl ammonium m-chlorobenzoate, 0.025 g of a 1.0 M solution in acetonitrile, was then added. TMS-MAA, 1.46 g (9.24 mmole), was then added. After 25 minutes, BzMA (purified by passing over a column of basic alumina and stored over 3 A sieves), 0.82 g (4.65 mmole), was added. After 23 minutes, 0.13 g sample was withdrawn, quenched with 0.03 g methanol, and 0.025 g decane was added followed by GC determination of BzMA concentration. The GC showed over 95% BzMA conversion.

The catalyst tetrabutyl ammonium m-chlorobenzoate, 0.025 g of a 1.0 M solution in acetonitrile, was then added. TMS-MAA, 1.44 g (9.11 mmole), was then added. After 24 minutes, BzMA (purified by passing over a column of basic alumina and stored over 3 A sieves), 0.84 g (4.77 mmole), was added. After 24 minutes, 0.16 g sample was withdrawn, quenched with 0.03 g methanol, and 0.025 g decane was added followed by GC determination of BzMA concentration. The GC showed over 95% BzMA conversion.

The catalyst tetrabutyl ammonium m-chlorobenzoate, 0.025 g of a 1.0 M solution in acetonitrile, was then added. TMS-MAA, 1.43 g (9.05 mmole), was then added. After 23 minutes, BzMA (purified by passing over a column of basic alumina and stored over 3 A sieves), 0.87 g (4.94 mmole), was added. After 24 minutes, 0.15 g sample was withdrawn, quenched with 0.03 g methanol, and 0.025 g decane was added followed by GC determination of BzMA concentration. The GC showed over 95% BzMA conversion.

The catalyst tetrabutyl ammonium m-chlorobenzoate, 0.025 g of a 1.0 M solution in acetonitrile, was then added. TMS-MAA, 1.40 g (8.86 mmole), was then added. After 21 minutes, BzMA (purified by passing over a column of basic alumina and stored over 3 A sieves), 0.84 g (4.77 mmole), was added. After 20 minutes, the catalyst tetrabutyl ammonium m-chlorobenzoate, 0.025 g of a 1.0 M solution in acetonitrile, was added. TMS-MAA, 1.42 g (8.99 mmole), was then added. After 22 minutes, BzMA (purified by passing over a column of basic alumina and stored over 3 A sieves), 0.82 g (4.65 mmole), was added. After 220 minutes, the catalyst tetrabutyl ammonium m-chlorobenzoate, 0.025 g of a 1.0 M solution in acetonitrile, was added. TMS-MAA, 1.40 g (8.86 mmole), was then added. After 32 minutes, BzMA (purified by passing over a column of basic alumina and stored over 3 A sieves), 0.82 g (4.65 mmole), was added. After 16 minutes, the catalyst tetrabutyl ammonium m-chlorobenzoate, 0.025 g of a 1.0 M solution in acetonitrile, was added. TMS-MAA, 1.41 g (8.92 mmole), was then added. After 16 minutes, BzMA (purified by passing over a column of basic alumina and stored over 3 A sieves), 0.80 g (4.54 mmole), was added. After 17 minutes, the catalyst tetrabutyl ammonium m-chlorobenzoate, 0.025 g of a 1.0 M solution in acetonitrile, was added. TMS-MAA, 1.41 g (8.92 mmole), was then added. After 21 minutes, BzMA (purified by passing over a column of basic alumina and stored over 3 A sieves), 0.80 g (4.54 mmole), was added. After stirring for additional 11 hours, 19 g methanol was added to the reaction mixture to quench the polymer and to convert trimethylsilylcarboxyl groups into carboxylic groups. The polymer was isolated by removing volatiles in a vacuum oven at 90° C. for 23 hours. 0.20 g sample of polymer was dissolved in 10 ml DMSO (dimethyl sulfoxide), and the acid number (228.0; acid value (AV)= 4.07) was determined by titration with 0.1 N KOH in methanol. The polymer had an Mn=5,430, Mw/Mn=1.16 as determined by GPC (SEC) vs. universal calibration in THF at room temperature.

The polymer dispersion/solution was prepared by charging 0.40 g polymer sample; deionized water, 3.5 g; and 50 wt % sodium hydroxide solution, 0.128 g, into a 20 ml glass vial, capped and homogenized by placing into an oven at 65° C. for 7 hours, while occasionally taking the vial out and shaking.

Example 18

Dispersion of Carbon Nanotubes Using Multiblock Polymers

To 35 mg of HipCo carbon nanotubes (CNTs) (CNI, (Houston, Tex.)) were added 35 mg glycogen and 17.5 mL doubly distilled water to give a final concentration of 2 mg CNTs per mL. The suspension was placed in a 50 mL tube sitting in an ice-water bath. The suspension was sonicated (Ultrasonic Processor, Model GE 130) for 2 h using a 6 mm probe at a 50% duty cycle (1 s maximum power, 1 s off). The suspension was then aliquoted into 1 mL aliquots and stored at 4° C. until use.

Figure 1:
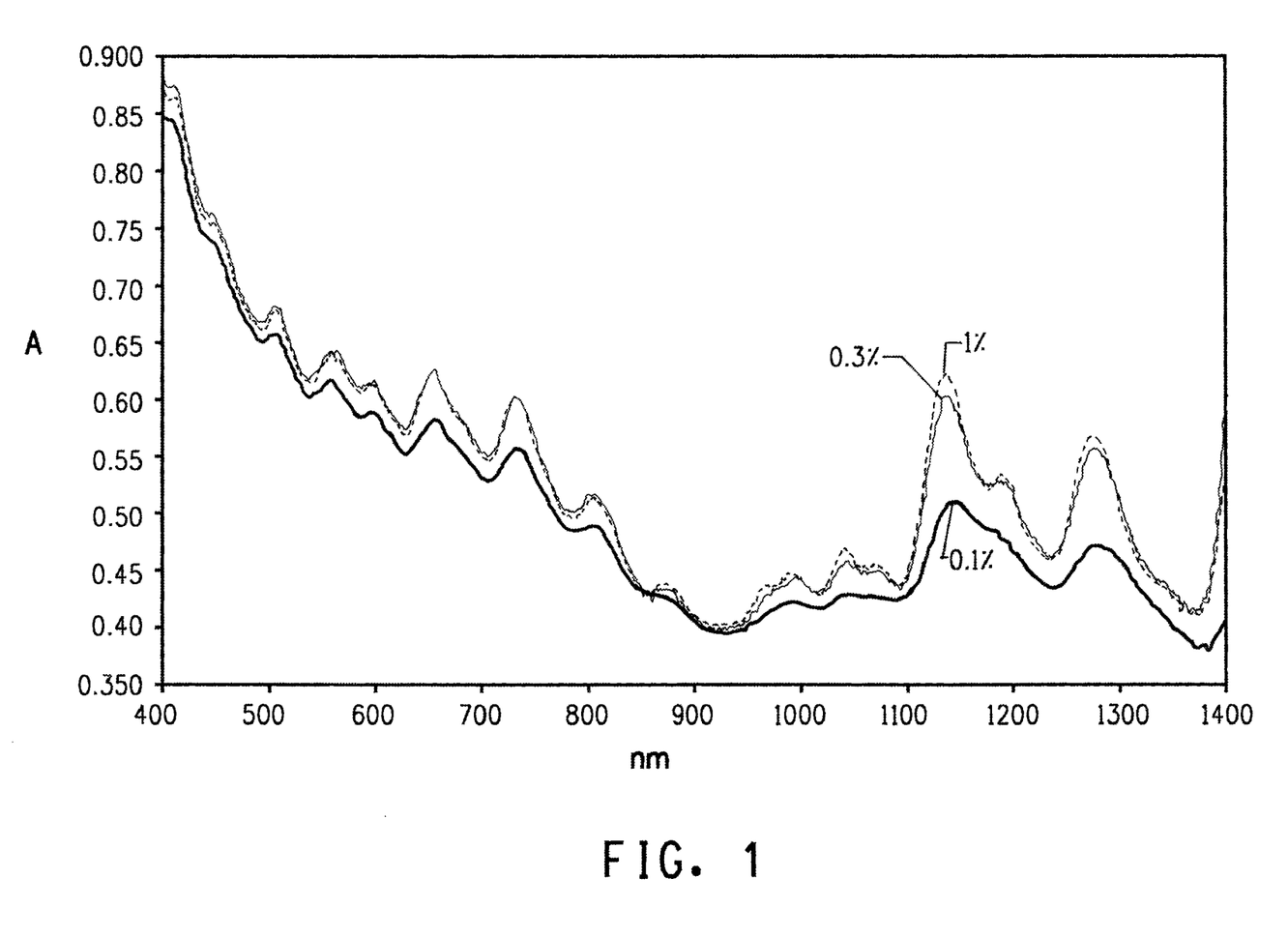
FIG. 1 is a UV/Vis/NIR absorbance spectrum for HipCo nanotubes as described in example 18

For use, each glycogen suspension of nanotubes was diluted with an equal volume of water, given a short burst of the sonicator (2 mm probe) and spun at room temperature at 14,000 rpm for 10 min in a Spectrafuge 16M centrifuge. The supernatant was discarded. The pellets were then resuspended in 1 mL of 0.1%, 0.3% or 1% multiblock polymer in water. A 1 mL suspension was then sonicated in a 1.7 mL Eppendorf tube sitting in an ice-water bath. A 2 mm probe was used at maximum power (8 W) for 1 h after which the sample was spun at 14,000 rpm for 10 min in a Spectrafuge 16M centrifuge. The supernatant was retained and characterized by taking its UV/Vis/NIR absorbance spectrum. An example of such a spectrum is shown in FIG. 1 for HipCo nanotubes. With increasing polymer concentrations, the absorbance spectrum increased in amplitude, shifted to the blue and sharpened. The concentration of CNTs in the case of 1% multiblock 27 was on the order of 5-10 mg/mL.

The attached table shows a comparison of the dispersions of HipCo CNTs in different multiblock polymers at different concentrations, measured at 930 and 1140 nm to determine the degree of solubilization. The higher the numbers, the greater the solubilization. In addition, the ratio of the OD1140 nm to the OD930 nm gives an indication of the sharpness of the peaks, where increasingly monomeric CNT dispersions show a higher OD1140/OD930. The results with various multiblock polymers are compared to CNT dispersions using RNA, DNA Amino ((GT)20) (prepared as described in WO2004/048255) and Triton X-405. Of those multiblock polymers listed Table 1 below, Polymer 65A ((MAA-BzMA)9) gives the best solubilization and the best dispersion.

TABLE 1

| Ex. No. | Polymer Number | M.W. | A.V. | 0.10% | | | 0.30% | | |
|---|---|---|---|---|---|---|---|---|---|
| | | | | O.D. = 930 | O.D. = 1140 | Ratio | O.D. = 930 | O.D. = 1140 | Ratio |
| 1 | 93 Ex. 1 | 5,530 | 2.35 | 3.038 | 3.738 | 1.23 | | | |
| 2 | 103 Ex. 2 | 10,970 | 2.28 | 0.903 | 1.072 | 1.187 | | | |
| 3 | 109 Ex. 3 | 16,400 | 2.26 | 1.223 | 1.465 | 1.198 | | | |
| 4 | 123 Ex. 4 | 27,270 | 2.24 | 1.418 | 1.736 | 1.224 | | | |
| 7 | 894-25 | 1,500 | 3.6 | 7.29 | 9.78 | 1.342 | 21.481 | 31.753 | 1.478 |
| 8 | 894-27 | 2,000 | 4.2 | 3.953 | 5.118 | 1.295 | 9.667 | 14.646 | 1.515 |
| 9 | 894-41 | 2540 | 5.4 | 3.57 | 4.38 | 1.227 | 4.396 | 5.875 | 1.336 |
| 10 | 51 | 3,240 | 2.7 | 5.5808 | 7.3248 | 1.313 | 6.2911 | 8.0063 | 1.273 |
| 11 | 53 | 4,120 | 4.2 | 2.4427 | 2.9648 | 1.214 | 7.648 | 10.242 | 1.339 |
| 15 | 67A Ex. 15 | 3,050 | 4.5 | 7.881 | 10.988 | 1.394 | 10.33 | 15.37 | 1.488 |
| 15 | 65A | | | | | | 13.25 | 19.35 | 1.46 |
| 15 | 65A | 2,360 | 3.3 | 6.974 | 9.869 | 1.415 | 12.56 | 19.84 | 1.58 |
| 16 | 81A | 3,670 | 3.2 | 4.1839 | 5.623 | 1.344 | 9.028 | 13.226 | 1.465 |
| 17 | 83A Ex. 17 | 4,790 | 4.1 | 7.322 | 10.082 | 1.377 | 8.973 | 12.56 | 1.4 |
| Comp 1 | 137 Comp Ex. | 9,290 | 2.8 | 1.663 | 2.003 | 1.204 | | | |
| Comp 2 | 139 | 4,690 | 2.8 | 4.418 | 5.621 | 1.272 | 9.982 | 13.781 | 1.381 |
| Comp 3 | 55 Comp. | 9,320 | 3.1 | 1.044 | 1.255 | 1.202 | 2.834 | 3.543 | 1.25 |
| Comp 4 | 59 Comp. | 12,000 | 4.1 | 1.663 | 2.001 | 1.203 | 2.353 | 2.934 | 1.247 |
| Avg. of Examples | | | | 4.291 | 5.703 | 1.289 | 10.362 | 15.087 | 1.433 |
| Avg. of Com. Ex. (random) | | | | 2.197 | 2.72 | 1.220 | 5.056 | 6.753 | 1.293 |
| RNA | | | | 5.3 | 8.3 | 1.566 | | | |
| AminoGT (20) | | | 12.3 | 20.5 | | 1.667 | | | |
| TritonX405 | | | | | | | | | |

| Peptide | MW | 0.10% | | | 0.30% | | |
|---|---|---|---|---|---|---|---|
| ACFD (10) | 2,681.9 | 1.686 | 1.871 | 1.11 | 9.253 | 11.198 | 1.21 |
| ACYD (10) | 2,841.4 | 2.317 | 2.62 | 1.131 | | | |

| | | 0.10% | | |
|---|---|---|---|---|
| ACWD (10) | 3,072.0 | 5.71 | 6.85 | 1.2 |

| | | 1% | | | |
|---|---|---|---|---|---|
| Ex. No. | Polymer Number | O.D. = 930 | O.D. = 1140 | Ratio | |
| 1 | 93 Ex. 1 | | | | MAA-[(BzMA)5(MAA)3]4(BzMA)5 |
| 2 | 103 Ex. 2 | | | | MAA-[(BzMA)10(MAA)6]4(BzMA)10 |
| 3 | 109 Ex. 3 | | | | MAA-[(BzMA)15(MAA)9]4(BzMA)15 |
| 4 | 123 Ex. 4 | | | | MAA-[(BzMA)25(MAA)15]4(BzMA)25 |
| 7 | 894-25 | 19.072 | 28.669 | 1.503 | (MAA/BzMA)6 (1/1 mole)6 dodeca-block |
| 8 | 894-27 | 16.098 | 24.725 | 1.536 | (MAA2/BzMA)6 (2/1 mole)6 dodeca-block |
| 9 | 894-41 | 17.694 | 26.327 | 1.488 | (MAA2/BzMA)6 (3/1 mole)6 dodeca-block |
| 10 | 51 | 14.837 | 21.82 | 1.471 | MAA-[(BzMA)2-(MAA)2]5-(BzMA)2 |
| 11 | 53 | 17.161 | 25.166 | 1.466 | MAA-[(BzMA)2-(MAA)4]5-(BzMA)2 |
| 15 | 67A Ex. 15 | 13.345 | 20.267 | 1.519 | MAA-(BzNA-MAA2)8-BzMA |
| 15 | 65A | | | | (MAA-BzMA)9 |
| 15 | 65A | 11.995 | 18.568 | 1.548 | (MAA-BzMA)9 |
| 16 | 81A | 17.112 | 26.514 | 1.549 | (MAA-BzMA)14 |
| 17 | 83A Ex. 17 | 13.366 | 20.006 | 1.497 | MAA-(BzMA-MAA2)13-BzMA |

TABLE 1-continued

| | | | | | |
|---|---|---|---|---|---|
| Comp 1 Comp Ex. | 137 | | | | MAA-(BzMA)40(MAA)25 |
| Comp 2 | 139 | 15.244 | 22.864 | 1.5 | MAA-(BzMA)20(MAA)12 |
| Comp 3 | 55 Comp. | 14.222 | 19.435 | 1.367 | random analogue of 25 |
| Comp 4 | 59 Comp. | 17.251 | 24.811 | 1.438 | random analogue of 27 |
| Avg. of Examples | | 15.631 | 23.562 | 1.509 | |
| Avg. of Com. Ex. (random) | | 15.572 | 22.37 | 1.435 | |
| RNA | | | | | |
| AminoGT (20) | | | | | |
| TritonX405 | | 3.48 | 4.68 | 1.345 | |
| Peptide | | | 1% | | |
| ACFD (10) | | 13.431 | 17.691 | 1.317 | |
| ACYD (10) | | 15.63 | 18.772 | 1.201 | |
| | | | 0.80% | | |
| ACWD (10) | | 5.731 | 7.598 | 1.326 | |

What is claimed is:

1. A method for dispersing a population of carbon nanotubes comprising:
   (a) providing a solution of multiblock polymers;
   (b) contacting a population of carbon nanotubes with the multiblock polymer solution of step (a) to disperse the carbon nanotubes; and
   (c) optionally recovering the dispersed carbon nanotubes
   wherein the multiblock polymers have the formula:

$(R_2)_a\text{—}[(R_1)_y\text{—}(R_2)_x]_z\text{—}(R_1)_b$ and
   wherein:
   $R_1$ is benzylmethacrylate;
   $R_2$ is methacrylic acid or salt thereof;
   x is an integer ranging from 1 to 15;
   y is an integer from 1 to 25;
   z is an integer ranging from 1 to 13;
   a is an integer from 0 to 15; and
   b is 0 or y.

2. The method of claim 1, wherein the multiblock polymer solution is aqueous.

3. The method of claim 1, wherein the contacting is done in the presence of agitation.

4. The method of claim 1 wherein the carbon nanotube is a single-walled nanotube.

5. The method of claim 3, wherein the agitation is selected from the group consisting of sonication, high shear mixing, and any combination thereof.

6. A carbon nanotube-multiblock polymer complex comprising an unfunctionalized carbon nanotube bound to a multiblock polymer wherein the multiblock polymers have the formula:

$(R_2)_a\text{—}[(R_1)_y\text{—}(R_2)_x]_z\text{—}(R_1)_b$ and wherein:
   $R_1$ is benzylmethacrylate;
   $R_2$ is methacrylic acid or salt thereof;
   x is an integer ranging from 1 to 15;
   y is an integer from 1 to 25;
   z is an integer ranging from 1 to 13;
   a is an integer from 0 to 15; and
   b is 0 or y.

* * * * *